US008310903B1

(12) United States Patent
Takayama et al.

(10) Patent No.: US 8,310,903 B1
(45) Date of Patent: Nov. 13, 2012

(54) THERMALLY-ASSISTED MAGNETIC RECORDING HEAD, HEAD GIMBALS ASSEMBLY, HEAD ARM ASSEMBLY, AND MAGNETIC DISK DEVICE, AND METHOD OF MANUFACTURING THERMALLY-ASSISTED MAGNETIC RECORDING HEAD

(75) Inventors: Seiichi Takayama, Tokyo (JP); Shinji Hara, Tokyo (JP); Koji Shimazawa, Tokyo (JP); Yasuhiro Ito, Tokyo (JP); Nobuyuki Mori, Tokyo (JP); Ryo Hosoi, Tokyo (JP)

(73) Assignees: TDK Corporation, Tokyo (JP); SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/222,795

(22) Filed: Aug. 31, 2011

(51) Int. Cl.
G11B 21/08 (2006.01)

(52) U.S. Cl. ............... 369/30.01; 369/30.02; 360/59; 29/603.01

(58) Field of Classification Search .................. None
See application file for complete search history.

(56) References Cited

U.S. PATENT DOCUMENTS

| 5,481,082 | A | 1/1996 | Yamamoto |
| 7,804,655 | B2 | 9/2010 | Shimazawa et al. |
| 7,974,043 | B2 | 7/2011 | Shimazawa et al. |
| 2008/0043360 | A1 | 2/2008 | Shimazawa et al. |
| 2008/0316872 | A1* | 12/2008 | Shimizu et al. ............ 369/13.24 |
| 2009/0052078 | A1 | 2/2009 | Tanaka et al. |
| 2012/0087217 | A1* | 4/2012 | Sasaki et al. ............... 369/13.24 |
| 2012/0090162 | A1* | 4/2012 | Shimazawa et al. ....... 29/603.01 |

FOREIGN PATENT DOCUMENTS

| JP | A-07-037911 | 2/1995 |
| JP | A-2008-047268 | 2/2008 |
| JP | A-2008-059694 | 3/2008 |

OTHER PUBLICATIONS

U.S. Appl. No. 13/404,704, filed Feb. 24, 2012.

* cited by examiner

Primary Examiner — Joseph Feild
Assistant Examiner — Henok Heyi
(74) Attorney, Agent, or Firm — Oliff & Berridge, PLC

(57) ABSTRACT

A method of manufacturing a thermally-assisted magnetic recording head includes: providing bar including, arranged in a first direction, a plurality of thermally-assisted magnetic recording head sections each including a waveguide, and a plurality of light source units each including a substrate with a light source mounted on a first surface of the substrate; bonding a second surface of the substrate to the bar with a bonding layer while allowing a light emitting position of the light source to be in opposition to the waveguide and allowing the first surface to be parallel to the first direction; and separating the bar for each of the thermally-assisted magnetic recording head sections. The substrate is bonded to the bar by radiating each laser beam from a dead angle direction where the first surface on which the light source units are provided is hidden from view.

19 Claims, 15 Drawing Sheets

THERMALLY-ASSISTED MAGNETIC RECORDING HEAD, HEAD GIMBALS ASSEMBLY, HEAD ARM ASSEMBLY, AND MAGNETIC DISK DEVICE, AND METHOD OF MANUFACTURING THERMALLY-ASSISTED MAGNETIC RECORDING HEAD

BACKGROUND OF THE INVENTION

1. Field of the Invention

The invention relates to a thermally-assisted magnetic recording head in use for the thermally-assisted magnetic recording that reduces a coercive force of a magnetic write medium by irradiating near-field light to perform information writing, and a head gimbals assembly, a head arm assembly, and a magnetic disk device that are provided with the thermally-assisted magnetic recording head, as well as a method of manufacturing the thermally-assisted magnetic recording head.

2. Description of the Related Art

In the past, a magnetic disk device has been used as a means for writing and reading magnetic information (hereinafter referred to as "information" simply). The magnetic disk device is provided, within a housing for example, with a magnetic disk to store the information thereon, and a magnetic reading/recording head to write the information on the magnetic disk and to read the information written on the magnetic disk. The magnetic disk, which is supported on a rotary shaft of a spindle motor fixed within the housing, is intended to rotate on the rotary shaft. On the other hand, the magnetic reading/recording head, which is formed on one side surface of a magnetic head slider provided at one end of a suspension, is configured including a magnetic write element and a magnetic read element each having an air bearing surface (ABS: Air Bearing Surface) in opposition to the magnetic disk. In particular, as the magnetic read element, an MR element exhibiting a magnetoresistive (MR: Magnetoresistive) effect is generally used. The other end of the suspension is attached to the front end of an arm supported to be rotatable on a fixed shaft that is provided in a standing state within the housing.

When the magnetic disk device is placed in a stationary state, i.e., when the magnetic disk does not rotate, but stands still, the magnetic reading/recording head is not present on the magnetic disk, but is placed in an external refuge state (unload state). Then, if the magnetic disk device is placed in a driven state, and the magnetic disk starts its rotation, the magnetic reading/recording head is placed in a state of movement to a given position on the magnetic disk along with the suspension (load state). On reaching the predetermined rotating speed of the magnetic disk, the magnetic head slider is stabilized in a state of being lifted slightly from the top surface of the magnetic disk by virtue of the balance between positive pressure and negative pressure, thereby assuring to accurately perform write and read operation of the information.

With the increasing write density (increasing capacity) of the magnetic disk in recent years, improved performance of the magnetic reading/recording head and the magnetic disk has been demanded. The magnetic disk is a discrete medium with a collection of magnetic particulates, each of which is of a single magnetic domain structure. In this magnetic disk, a single write bit is configured by a plurality of magnetic particulates. To increase the write density, the irregularity on a boundary of the adjacent write bits has to be reduced, and thus the magnetic particulates have to be reduced in size. However, reduction in size of the magnetic particulates leads to decrease in volume of the magnetic particulates, causing the thermal stability of magnetization for the magnetic particulates to deteriorate as an issue, accordingly. In solving such an issue, it is useful to increase the anisotropic energy of the magnetic particulates. However, increased anisotropic energy of the magnetic particulates results in increased coercive force of the magnetic disk, causing an issue that information write operation becomes difficult in the existing magnetic heads.

As a method for solving the issue as mentioned above, a method of what is called the thermally-assisted magnetic recording is proposed. Such a method uses a magnetic write medium with a large coercive force, and applies the magnetic field and heat simultaneously to a portion on which the information is written on the magnetic write medium at the time of information write operation to write the information with temperature at that portion increased and a coercive force decreased. The magnetic head in use for the thermally-assisted magnetic recording is hereinafter referred to as the thermally-assisted magnetic recording head.

In performing the thermally-assisted magnetic recording, a method using the near-field light is commonly used as a method for applying heat to the magnetic write medium. As a method for generating the near-field light, a method using a near-field light probe that is a piece of metal, what is called a plasmon generator, is generally known. The plasmon generator generates the plasmon through excitation by means of external incident light, resulting in generation of the near-field light. A light source for supplying the external incident light is necessary, and various embodiments in regard to mounting of the light source have been proposed to date. Until now, the applicant has proposed, for example, a thermally-assisted magnetic recording head having a "composite slider structure" to bond a light source unit with a laser oscillator with the surface on the side opposite to the ABS of the slider on which the magnetic write element is formed. The "composite slider structure" has been disclosed, for example, in US Patent Application Publication No. 2008/043360 specification and in US Patent Application Publication No. 2009/052078 specification.

In a method for performing the thermally-assisted magnetic recording using the plasmon generator, it is important to stably supply the light with sufficient intensity to a desired position on the magnetic write medium. For this purpose, high alignment accuracy has to be assured in fixing the light source unit to the slider. One reason comes from the fact that deterioration in the alignment accuracy may lead to degradation in heating efficiency for the magnetic write medium, causing a major issue in performing the thermally-assisted magnetic recording. For such a reason, the thermally-assisted magnetic recording head has been desired that is excellent in the write efficiency in spite of a compact configuration as well as being simply manufacturable. In addition, a simple method of manufacturing such a thermally-assisted magnetic recording head has been also desired.

SUMMARY OF THE INVENTION

A thermally-assisted magnetic recording head according to one embodiment of the invention includes: a slider having a thermally-assisted magnetic recording head section thereon; and a light source unit including a substrate and a light source mounted on the substrate. The substrate has a first surface which supports the light source, a second surface bonded to the slider with a bonding layer in between, and a third surface which intersects both of the first and second surfaces and has a laser beam irradiation mark thereon. The laser beam irradiation mark has a pothole-shaped profile having a deepest point at a position which is, on a plan view, closer to the first surface than a center position of the laser beam irradiation mark.

A head gimbals assembly, a head arm assembly, and a magnetic disk device according to one embodiments of the invention is provided with the thermally-assisted magnetic recording head described above.

In the thermally-assisted magnetic recording head, as well as the head gimbals assembly, the head arm assembly, and the magnetic disk device that are provided therewith according to one embodiments of the invention, bonding between the light source unit and the slider with the bonding layer in between is performed by radiating a laser beam to the third surface of the substrate. The laser beam is radiated to the substrate from an opposite side of the first surface, i.e., from a direction where the first surface is invisible (hereinafter referred to as back side). If the laser beam is radiated to the substrate from a direction where the first surface is visible (hereinafter referred to as front side), the light source, an electrode pad and the like that are provided on the first surface may be damaged due to an erroneous irradiation. In the present embodiments, however, such a damage caused by the erroneous irradiation is avoided.

A method of manufacturing a thermally-assisted magnetic recording head according to one embodiment of the invention includes: providing a bar and a plurality of light source units, the bar including a plurality of thermally-assisted magnetic recording head sections arranged in a first direction that is a longitudinal direction, and each of the light source units including a substrate and a light source mounted on the substrate, the substrate having a first surface which supports the light source, a second surface and a third surface intersecting both of the first and second surfaces; aligning the plurality of light source units to the thermally-assisted magnetic recording head sections on the bar, respectively, while allowing a first surface of the substrate, which supports the light source, to be parallel to the first direction, and then performing a bonding between a second surface of the substrate and the bar with an bonding layer in between; and separating the bar into a plurality of sliders each including one of the thermally-assisted magnetic recording head sections. The bonding allows a third surface of the substrate intersecting both of the first and second surfaces to be irradiated by a laser beam from a dead angle direction where the first surface is hidden from view, to thereby allow the bonding layer to be melted.

In the method of manufacturing the thermally-assisted magnetic recording head according to one embodiment of the invention, the bonding layer is melted to bond the substrate to the bar, by radiating each laser beam from the dead angle direction where the first surface on which the light source units are provided is hidden from view. If the laser beam is radiated to the substrate from a direction where the first surface is visible (hereinafter referred to as front side), the light source, an electrode pad and the like that are provided on the first surface may be damaged due to erroneous irradiation. In the present embodiment, however, such a damage caused by the erroneous irradiation is avoided.

In the method of manufacturing the thermally-assisted magnetic recording head according to one embodiment of the invention, desirably, the laser beam is radiated obliquely from upper side. This is because damage of the slider due to the laser beam reflected on the third surface is avoided. Further, S-polarized light as the laser beam may be allowed to enter the third surface at a Brewster angle which is defined depending on a refraction index of the substrate and a wavelength of the laser beam. This suppresses generation of the light reflected on the third surface.

DETAILED DESCRIPTION OF THE PREFERRED EMBODIMENTS

Figure 1:
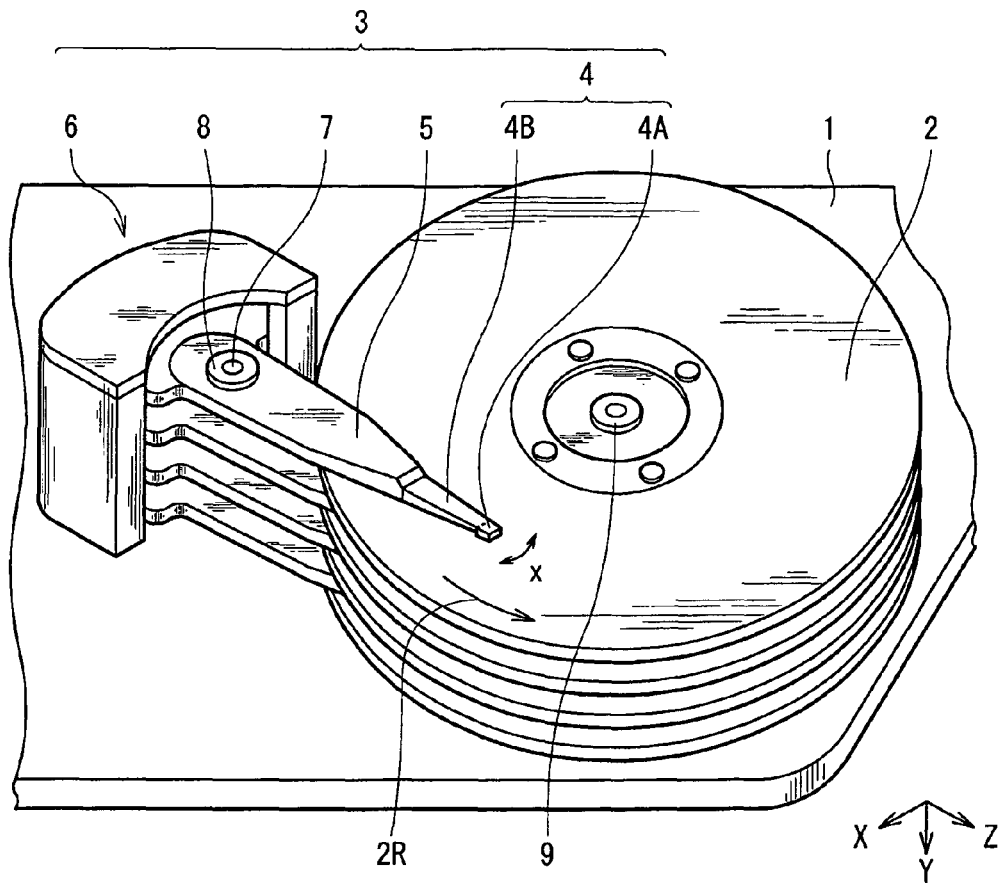
FIG. 1 is a perspective view depicting a structure of a magnetic disk device provided with a thermally-assisted magnetic recording head device according to one embodiment of the invention.

Referring to the drawings, one embodiment of the invention is described in details below.

[1. Structure of Magnetic Disk Device]

Figure 2:
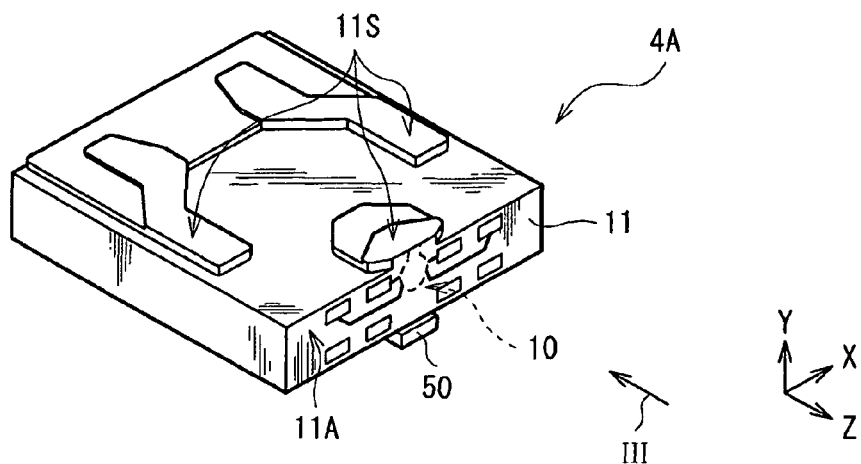
FIG. 2 is a perspective view depicting a structure of a slider in the magnetic disk device as shown in FIG. 1.

Referring first to FIG. 1 and FIG. 2, a structure of the magnetic disk device in accordance with one embodiment of the invention is described below.

FIG. 1 is a perspective view depicting an internal structure of the magnetic disk device in accordance with the present embodiment. Employing a load/unload (load/unload) method as a drive method, this magnetic disk device is provided, within a housing 1, with a magnetic disk 2 as a magnetic write medium to write information thereon, and a head arm assembly (HAA: Head Arm Assembly) 3 to write information on the magnetic disk 2 and to read that information, for example. The HAA 3 is provided with a head gimbals assembly (HGA: Head Gimbals Assembly) 4, an arm 5 for supporting a base of the HGA 4, and a drive section 6 served as a power source for rotating the arm 5. The HGA 4 has a thermally-assisted magnetic head device (hereinafter referred to as "magnetic head device" simply) 4A on which a magnetic reading/recording head section 10 (described later) according to the present embodiment is provided on one side surface, and a suspension 4B to which the magnetic head device 4A is attached on one end. The other end (end on the side opposite to the magnetic head device 4A) of the suspension 4B is supported by the arm 5. The arm 5 is structured to be rotatable via a bearing 8 on a fixed shaft 7 that is fixed as a central axis to the housing 1. The drive section 6 is configured of, for example, a voice coil motor and the like. The magnetic disk device is provided with a plurality of magnetic disks 2 (four pieces in FIG. 1), wherein the magnetic head devices 4A are disposed corresponding to writing faces (front face and rear face) on each of the magnetic disks 2. Each of the magnetic head devices 4A can move toward a direction traversing a write track, i.e., a track width direction (X-axis direction) in a plane parallel to a write face on each of the magnetic disks 2. On the other hand, the magnetic disks 2 rotate in a rotation direction 2R almost orthogonal to the X-axis direction on a spindle motor 9 fixed to the housing 1. By rotation of the magnetic disks 2 and movement of the magnetic head devices 4A, the information is written into the magnetic disks 2, or the written information is read out of the magnetic disks 2. In addition, the magnetic disk device is provided with a control circuit (described later) that controls read operation and write operation of the magnetic reading/recording head section 10, while controlling light-emitting operation of a laser diode that is a light source generating laser light for the thermally-assisted magnetic recording to be described later.

FIG. 2 depicts a structure of the magnetic head device 4A as shown in FIG. 1. The magnetic head device 4A has a block-shaped slider 11 configured of, for example, $Al_2O_3$.TiC (AlTiC). The slider 11 takes, for example, almost hexahedral form, one surface of which is an ABS 11S disposed to oppose and in proximity to the write face on the magnetic disk 2. While the magnetic disk device is not driven, i.e., while the spindle motor 9 halts, and the magnetic disk 2 does not rotate, the magnetic head device 4A is placed in a state of refuge at a position displaced from the upper side of the magnetic disk 2 (unload state) in order to avoid contact between the ABS 11S and write face. On the other hand, at the time of startup, the magnetic disk 2 begins high-speed rotation by the spindle motor 9, and the arm 5 is rotated by the drive section 6 on the fixed shaft 7 as a central axis, while the magnetic head device 4A moves to the upper side of the top surface of the magnetic disk 2 to be placed in a load state. High-speed rotation of the magnetic disk 2 generates an airflow between the write face and the ABS 11S, and the resulting lift force brings the magnetic head device 4A in a lifted state to keep a constant clearance MS (Magnetic Spacing) (refer to FIG. 5 described later) along the direction orthogonal to the write face (Y-axis direction). Further, the magnetic reading/recording head section 10 is provided on an element forming surface 11A that is one side surface orthogonal to the ABS 11S. On a surface 11B on the side opposite to the ABS 11S in the slider 11, a light source unit 50 is provided in the vicinity of the magnetic reading/recording head section 10.

[2. Detailed Structure of Magnetic Reading/Recording Head Section]

Figure 3:
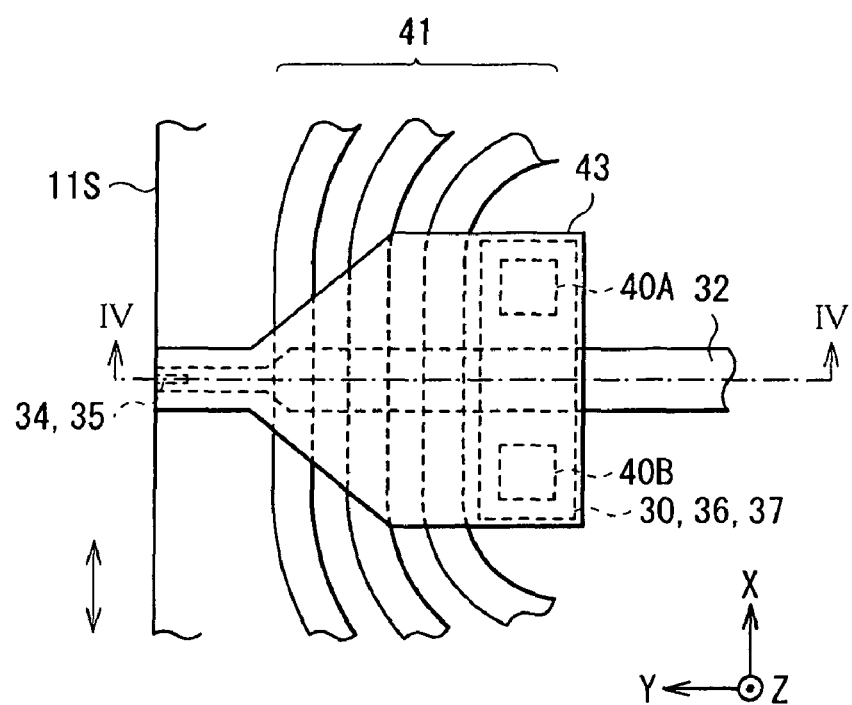
FIG. 3 is a top view depicting a relevant part structure viewed from III arrow-marked direction in a magnetic reading/recording head as shown in FIG. 2.
Figure 4:
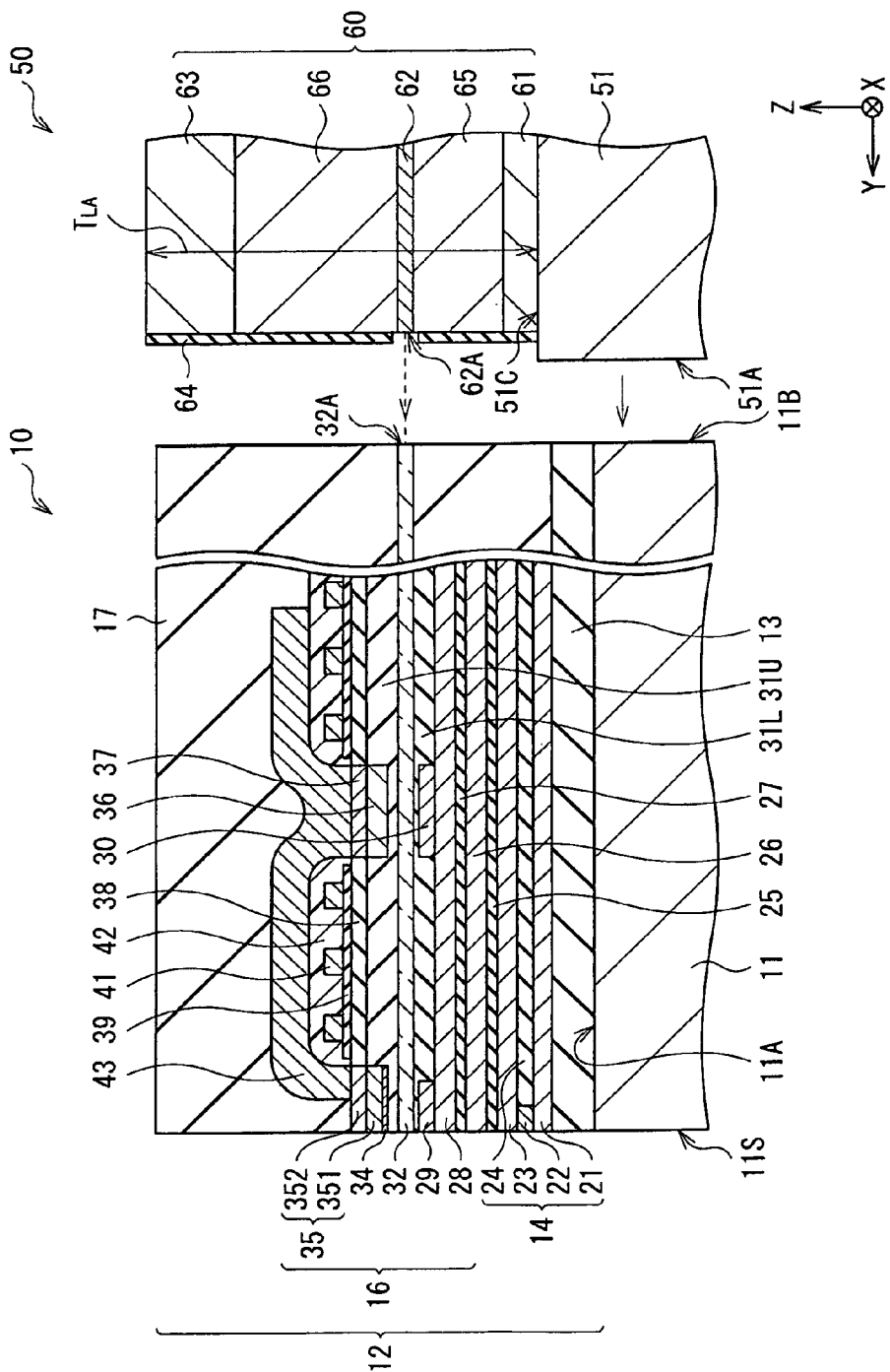
FIG. 4 is a cross-sectional view depicting a structure of the magnetic reading/recording head as shown in FIG. 3 in an arrow-marked direction along IV-IV line.
Figure 5:
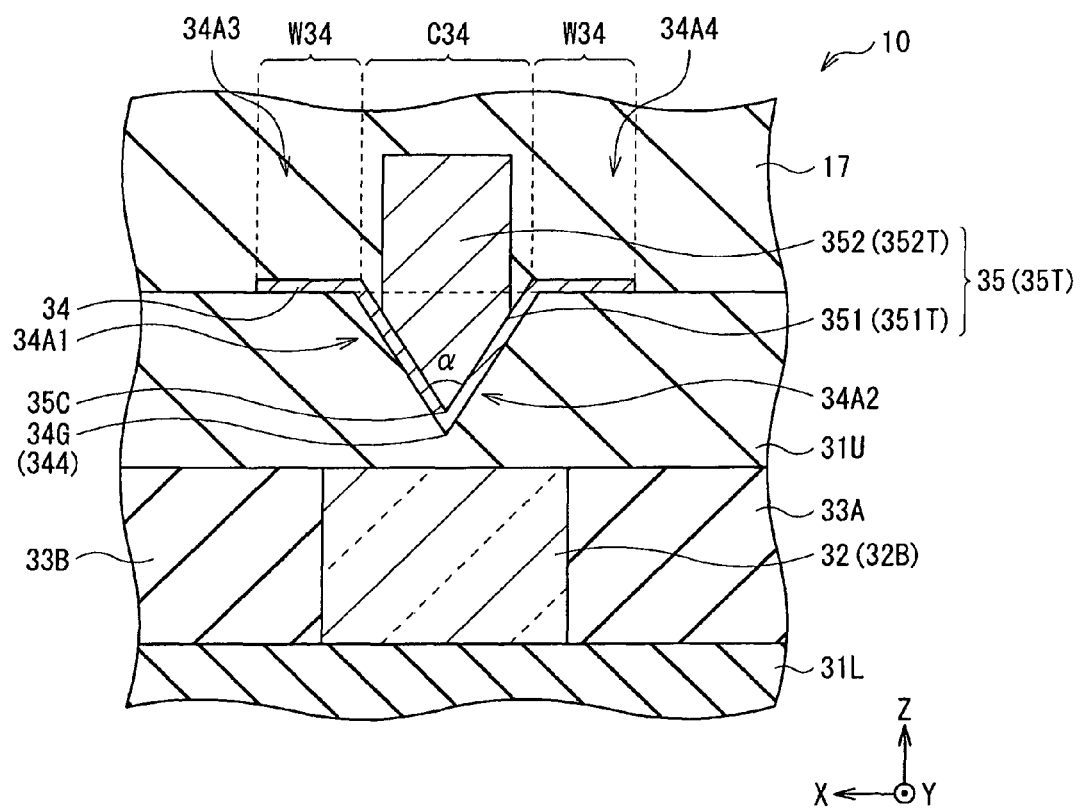
FIG. 5 is a top view depicting a structure of an end face exposed to an air bearing surface on main parts of the magnetic reading/recording head section.

Referring secondly to FIG. 3 to FIG. 5, more detailed description on the magnetic reading/recording head section 10 is given.

FIG. 3 is a top view of the magnetic reading/recording head section 10 as shown in FIG. 2 viewed from a direction of an arrow III, while FIG. 4 is a cross-sectional view depicting a structure as shown in FIG. 3 in an arrow-marked direction along IV-IV line. FIG. 5 enlarges a part of the end face exposed to the ABS 11S. The magnetic reading/recording head section 10, which is embedded into an element forming layer 12 provided on the substrate 11, has a stacked layer structure including an insulating layer 13, a reading head section 14, a recording head section 16, and a clad layer 17 that are stacked in order on the substrate 11. Each of the reading head section 14 and the recording head section 16 has an end face exposed to the ABS 11S.

The reading head section 14 executes a read processing operation utilizing the magnetoresistive effect (MR: magneto-resistive effect). On the reading head section 14, for example, a bottom shield layer 21, an MR element 22, and a top shield layer 23 are stacked in this order on the insulating layer 13.

The bottom shield layer 21 and the top shield layer 23, each of which is made of soft magnetic metal materials such as NiFe (nickel-iron alloy), are disposed to be in opposition to one another with the MR element 22 interposed between in a layer stack direction (Z-axis direction). This fulfills a protective function to prevent the MR element 22 from being affected by unwanted magnetic field.

On the MR element 22, one end face is exposed to the ABS 11S, and the other end faces come into contact with an insulating layer 24 for burying a space between the bottom shield layer 21 and the top shield layer 23. The insulating layer 24 is made of insulating materials such as $Al_2O_3$ (aluminum oxide), AlN (aluminum nitride), $SiO_2$ (silicon dioxide), or DLC (diamond-like carbon).

The MR element 22 functions as a sensor to read the magnetic information written into the magnetic disk 2. In the present embodiment, in the direction orthogonal to the ABS 11S (Y-axis direction), a direction proceeding toward the ABS 11S or a position close to the ABS 11S relative to the MR element 22 is called "front side", while a direction proceeding to the opposite side of the ABS 11S or a position apart from the ABS 11S relative to the MR element 22 is called "back side". The MR element 22 is, for example, a CPP (Current Perpendicular to Plane)—GMR (Giant Magnetoresistive) element, wherein a sensing current flows through its own inside in the layer stack direction. Here, the bottom shield layer 21 and the top shield layer 23 function as electrodes, thereby providing the sensing current to the MR element 22.

On the reading head section 14 employing such a structure, a magnetization direction of a free layer (not shown in the figures) included in the MR element 22 varies in response to a signal magnetic field from the magnetic disk 2. This generates relative variability between the magnetization direction of the free layer and that of a pinned layer (not shown in the figures) also included in the MR element 22. When the sensing current flows through the MR element 22, the relative variability in the magnetization direction appears as variation in electrical resistance. This is utilized to detect the signal magnetic field, resulting in the magnetic information being read out.

On the reading head section 14, an insulating layer 25, an intermediate shield layer 26, and an insulating layer 27 are stacked in this order. The intermediate shield layer 26 functions to prevent a magnetic field arising in the recording head section 16 from affecting the MR element 22, and is made of soft magnetic metal materials such as NiFe. The insulating layers 25 and 27 are formed of, for example, materials similar to those used for the insulating layer 24.

The recording head section 16 is a perpendicular magnetic recording head that performs a write processing operation using a thermally-assisted magnetic recording method. The recording head section 16 has, for example, a bottom yoke layer 28, a leading shield 29 and a coupling layer 30, a clad 31L, a waveguide 32, clads 33A, 33B, and clad 31U in this order on the insulating layer 27. The clads 33A and 33B constitute a first clad pair with the waveguide 32 interposed between in the track width direction (X-axis direction). On the other hand, the clads 31L and 31U constitute a second clad pair with the waveguide 32 interposed between in the thickness direction (Z-axis direction). Note that a structure omitting the leading shield 29 may be used.

The waveguide 32 is formed of dielectric materials for passing laser light. The constituent materials for the waveguide 32 include, for example, SiC, DLC, TiOx (titanium oxide), TaOx (tantalum oxide), SiNx (silicon nitride), SiOxNy (silicon oxynitride), Si (silicon), zinc selenide (ZnSe), NbOx (niobium oxide), GaP (gallium phosphide), ZnS (zinc sulfide), ZnTe (zinc telluride), CrOx (chromium oxide), FeOx (iron oxide), CuOx (copper oxide), SrTiOx (strontium titanate), BaTiOx (barium titanate), Ge (germanium), and C (diamond), etc. All of the clads 33A, 33B, 31L and 31U are made of dielectric materials exhibiting a refractive index lower than that of constituent materials of the waveguide 32 for the laser light propagated through the waveguide 32. The refractive index for the laser light propagated through the waveguide 32 may be the same or different in constituent materials of the clads 33A and 33B and constituent materials of the clads 31L and 31U. The dielectric materials for constituting the clads 33A, 33B, 31L and 31U can be SiOx (silicon oxide), $Al_2O_3$ (aluminum oxide), AlN (aluminum nitride), etc.

The bottom yoke layer 28, the leading shield 29, and the coupling layer 30 are all made of soft magnetic metal materials such as NiFe. The leading shield 29 is located at the most frontward side on the top surface of the bottom yoke layer 28 to be arranged with one end face exposed to the ABS 11S. The coupling layer 30 is located at the back side of the leading shield 29 on the top surface of the bottom yoke layer 28. The clad 31L, configured of dielectric materials having the refractive index lower than that of the waveguide 32 for the laser light propagated through the waveguide 32, is provided to cover the bottom yoke layer 28, the leading shield 29, and the coupling layer 30. The waveguide 32 provided on the clad 31L extends toward the direction orthogonal to the ABS 11S (Y-axis direction), and one end face is exposed to the ABS 11S, while the other end faces are exposed at the back side. Incidentally, the end faces at the front side of the waveguide 32 may not be exposed to the ABS 11S, but may be located at a position recessed from the ABS 11S. A cross-sectional shape of the waveguide 32 in parallel with the ABS 11S is, for example, a rectangle, but any other shapes may be permitted.

The recording head section 16 further has a plasmon generator 34 provided via the clad 31U at the upper side of a front end of the waveguide 32, and a magnetic pole 35 provided in contact with the top surface of the plasmon generator 34. Each of the plasmon generator 34 and the magnetic pole 35 is arranged with one end face exposed to the ABS 11S. The magnetic pole 35 has, for example, a structure in which a first layer 351 and a second layer 352 are stacked in order on the plasmon generator 34. Both of the first layer 351 and the second layer 352 are made of magnetic materials with high saturation flux density such as iron-based alloy. The iron-based alloy includes, for example, FeCo (iron-cobalt alloy), FeNi (iron-nickel alloy), or FeCoNi (iron-cobalt-nickel alloy), etc. The plasmon generator 34 generates near-field light NF (described later) from the ABS 11S on the basis of the laser light propagated through the waveguide 32. The magnetic pole 35 accommodates therein a magnetic flux arising in a coil 41 (described later) to release the magnetic flux from the ABS 11S, thereby generating a write magnetic field for writing the magnetic information into the magnetic disk 2. The plasmon generator 34 and the first layer 351 are embedded in a clad layer 33.

The recording head section 16 also has a coupling layer 36 embedded in the clad layer 33 at the back side of the plasmon generator 34 and the magnetic pole 35, and a coupling layer 37 provided in contact with the top surface of the coupling layer 36. Both of the coupling layers 36 and 37, which are located at the upper side of the coupling layer 30, are made of soft magnetic metal materials such as NiFe.

The recording head section 16 has two coupling sections 40A and 40B (FIG. 3) that are embedded in the clads 31U, 33A, and 33B. Those coupling sections 40A and 40B are also made of soft magnetic metal materials such as NiFe. The coupling sections 40A and 40B extend toward the Z-axis direction to link the coupling layer 30 with the coupling layer 36. Also, in the X-axis direction, they are provided to interpose the waveguide 32 between and to be separated away from the waveguide 32.

As shown in FIG. 4, an insulating layer 38 is provided on the clad 31U to bury a surrounding area of the second layer 352 on the magnetic pole 35. On the insulating layer 38, an insulating layer 39 and the coil 41 formed to swirl relative to the coupling layer 37 are stacked in order. The coil 41 generates a magnetic flux for writing in such a manner that write current flows through its own inside, and is formed of high-conductive materials such as Cu (copper), Au (gold), etc. The insulating layers 38 and 39 are made of insulating materials such as $Al_2O_3$, AlN, $SiO_2$, or DLC. The insulating layer 38, the insulating layer 39, and the coil 41 are covered by an insulating layer 42, and further a top yoke layer 43 is provided to cover the insulating layer 42. The insulating layer 42 is made of, for example, non-magnetic insulating materials such as photoresist or spin on glass (SOG: Spin On Glass) that flows at the time of heating. The insulating layers 38, 39, and 42 isolate the coil 41 electrically from a surrounding area. The top yoke layer 43 is configured of, for example, soft magnetic materials with high saturation magnetic flux density such as CoFe, and its front side portion is connected with the second layer 352 of the magnetic pole 35, while a part thereof is connected on the back side with the coupling layer 37. Further, a front side end face of the top yoke layer 43 is located at a position recessed from the ABS 11S.

On the recording head section 16 having such a structure, using write current flowing through the coil 41, the magnetic flux is generated within a magnetic path structured mainly by the leading shield 29, the bottom yoke layer 28, the coupling layer 30, the coupling sections 40A and 40B, the coupling layers 36 and 37, the top yoke layer 43, and the magnetic pole 35. This generates the signal magnetic field in the vicinity of the end face exposed to the ABS 11S of the magnetic pole 35. The signal magnetic field reaches a predetermined regional part on the write face of the magnetic disk 2.

Further, on the magnetic reading/recording head section 10, a clad 17 configured of, for example, materials similar to the clad 31U is formed to cover the overall top surface of the recording head section 16.

Figure 6A:
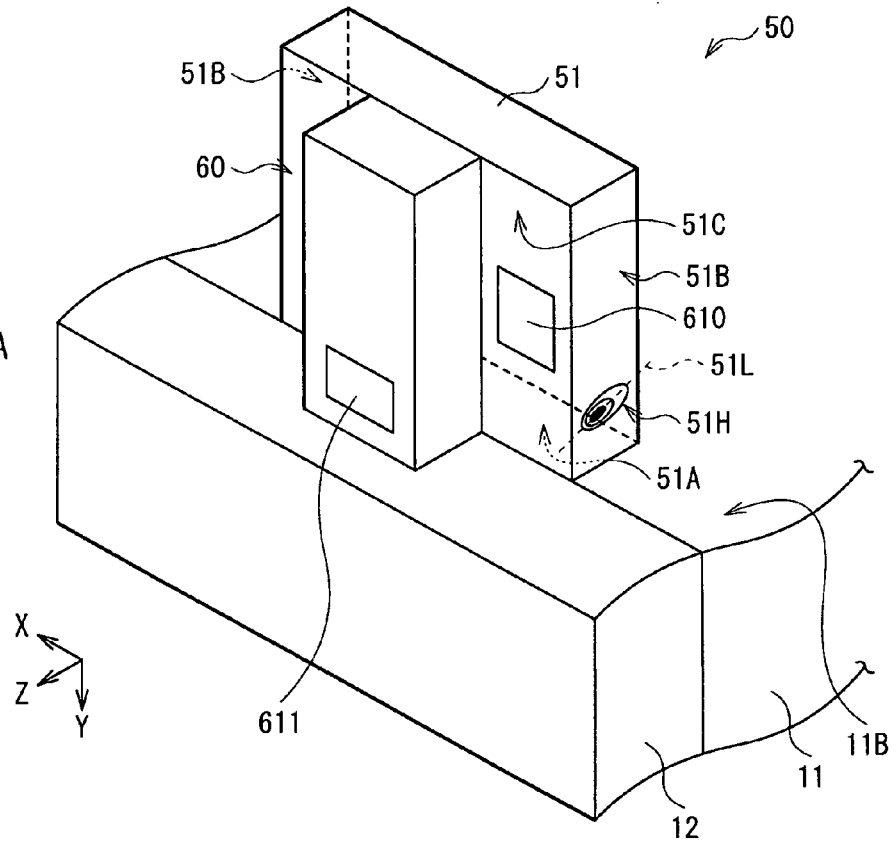
FIG. 6A is a perspective view depicting a schematic structure of the overall light source unit as shown in FIG. 1.

As shown in FIG. 6A, the light source unit 50 provided at the back side of the magnetic reading/recording head section 10 includes a laser diode 60 as a light source for emitting the laser light, and a rectangular solid-shaped supporting member 51 for supporting the laser diode 60. Incidentally, FIG. 6A is a perspective view depicting a schematic structure of the overall light source unit 50.

Figure 6B:
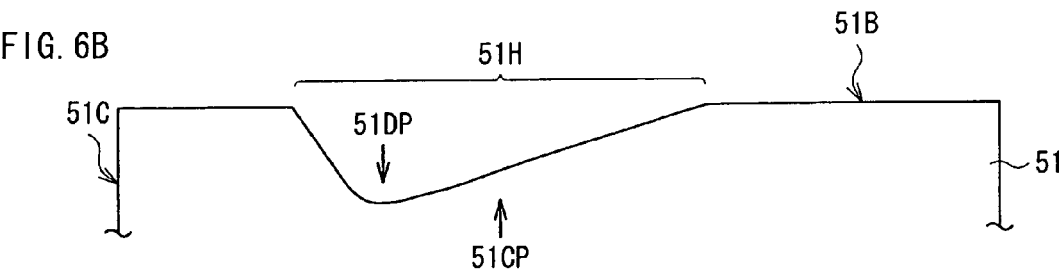
FIG. 6B is a cross-sectional view depicting a cross-sectional shape of an irradiation mark as shown in FIG. 6A.

The supporting member 51 is formed of, for example, ceramic materials such as $Al_2O_3$.TiC. As shown in FIG. 4, the supporting member 51 has a junction surface 51A to be bonded to a rear surface 11B of the slider 11, and a light source mounting surface 51C orthogonal to the junction surface 51A. The light source mounting surface 51C, which is in parallel with the element forming surface 11A, is a surface where the laser diode 60 is formed. On a pair of side surfaces 51B (refer to FIG. 6A and FIG. 6B) orthogonal to both of the junction surface 51A and the light source mounting surface 51C, an irradiation mark 51H by irradiation of the laser beam is formed. The irradiation mark 51H has a planar shape of an oval on a plan view, and an angle between a direction of its long axis 51L and the junction surface 51A is at least 0 degree but no more than 90 degrees. FIG. 6B depicts a cross-sectional structure along the long axis 51L for the irradiation mark 51H as shown in FIG. 6A. The irradiation mark 51H has a pothole-shaped profile having a deepest point 51DP at a position which is, on a plan view, closer to the light source mounting surface 51C than a center position 51CP. In particular, it is desirable that the deepest point 51DP be also located at a position closer to the junction surface 51A than the center position of the irradiation mark 51H. The irradiation marks 51H formed on a pair of side surfaces 51B have a relationship of plane symmetry with one another in their formation positions and shapes. Desirably, the supporting member 51 has a function of a heat sink to dissipate heat generated by the laser diode 60 apart from the function to support the laser diode 60.

For the laser diode 60, laser diodes such as InP-based, GaAs-based, and GaN-based ones that have been commonly used for communication, optical system disk storage, or material analysis applications are applicable. A wavelength of the laser light emitted by the laser diode 60 may be any value within the range of, for example, 375 nm to 1.7 μm. Specifically, it may be a InGaAs P/InP quaternary mixed crystal system laser diode with a light-emitting enable wavelength region of 1.2 to 1.67 μm. As shown in FIG. 4, the laser diode 60 has a multilayer structure including a bottom electrode 61, an active layer 62, and a top electrode 63. For example, an n-type semiconductor layer 65 including an n-type AlGaN is inserted between the bottom electrode 61 and the active layer 62, while, for example, a p-type semiconductor layer 66 including a p-type AlGaN is inserted between the active layer 62 and the top electrode 63. On each of two cut and split surfaces in this multilayer structure, there is provided a reflective layer 64 configured of materials such as $SiO_2$ and $Al_2O_3$ for exciting oscillation through total reflection of light. The reflective layer 64 is provided with an opening for emitting the laser light at a position including a luminescent center 62A of the active layer 62. Relative positions of the light source unit 50 and the magnetic reading/recording head section 10 are fixed so that the luminescent center 62A and a rear end face 32A of the waveguide 32 may be matched by bonding the junction surface 51A of the supporting member 51 to a rear surface 11B of the slider 11. A thickness $T_{LA}$ of the laser diode 60 is, for example, in the order of 60 to 200 μm. When a given voltage is applied between the bottom electrode 61 and the top electrode 63, the laser light is emitted from the luminescent center 62A of the active layer 62 to be incident onto the rear end face 32A of the waveguide 32. It is preferable that the laser light emitted from the laser diode 60 be polarized light in TM mode wherein an oscillation direction of a magnetic field is perpendicular to the surface on the active layer 62. A power supply within the magnetic disk device can be used for driving the laser diode 60. The magnetic disk device usually includes a power supply to generate a voltage of, for example, approx. 2V, and such a voltage of the power supply is high enough to drive the laser diode 60. Further, power consumption of the laser diode 60 is in the order of, for example, several tens mW, which can be covered sufficiently by the power supply within the magnetic disk device.

Figure 7:
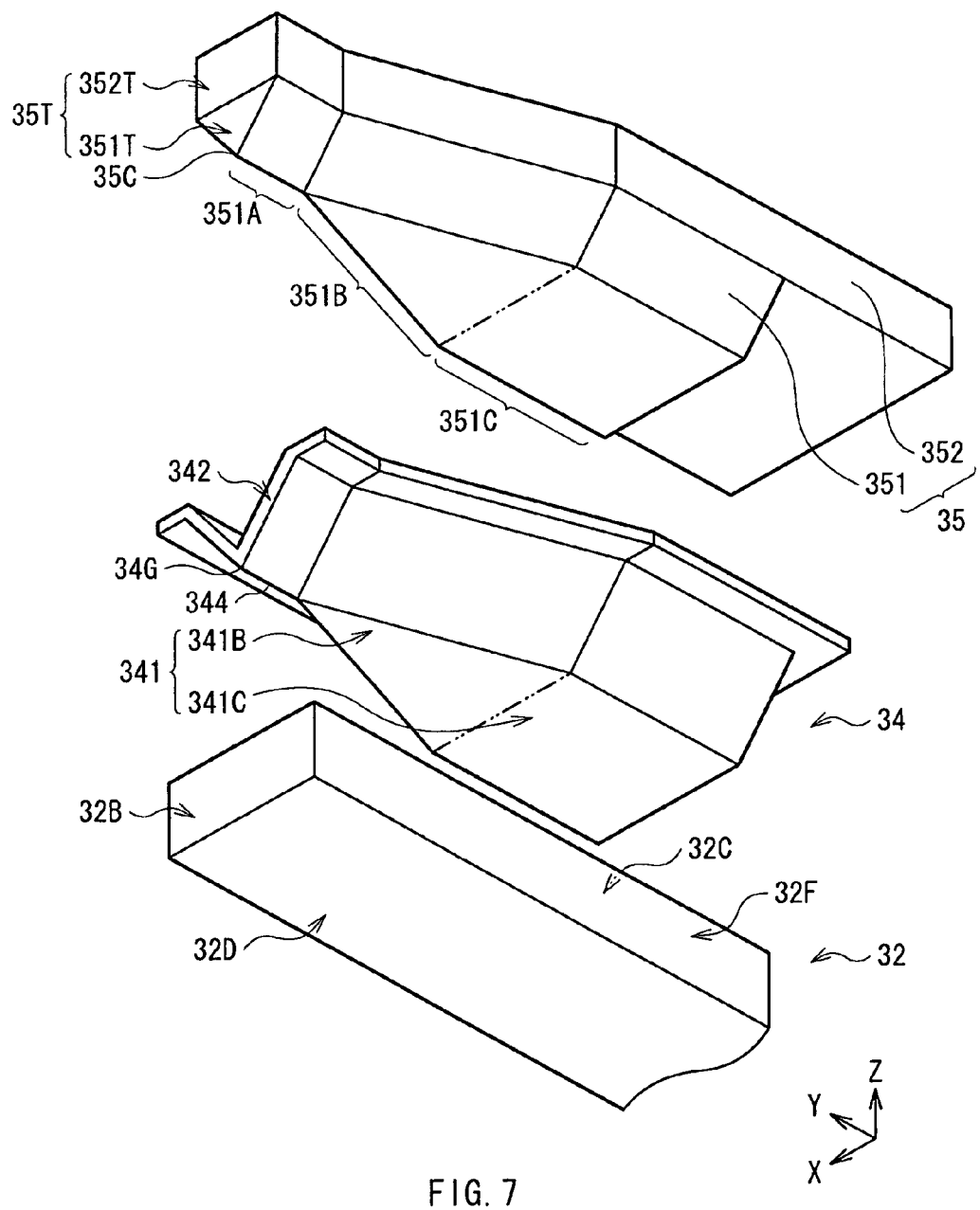
FIG. 7 is an exploded perspective view depicting a structure of main parts on the magnetic reading/recording head.
Figure 8:
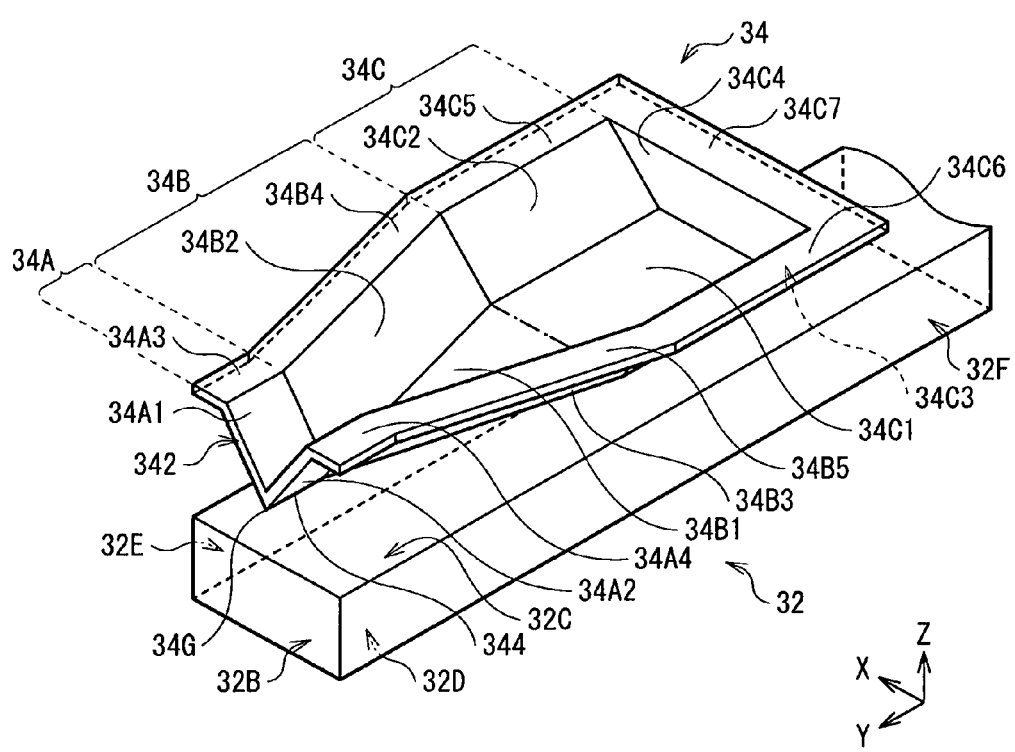
FIG. 8 is another perspective view depicting a structure of main parts on the magnetic reading/recording head.
Figure 9:
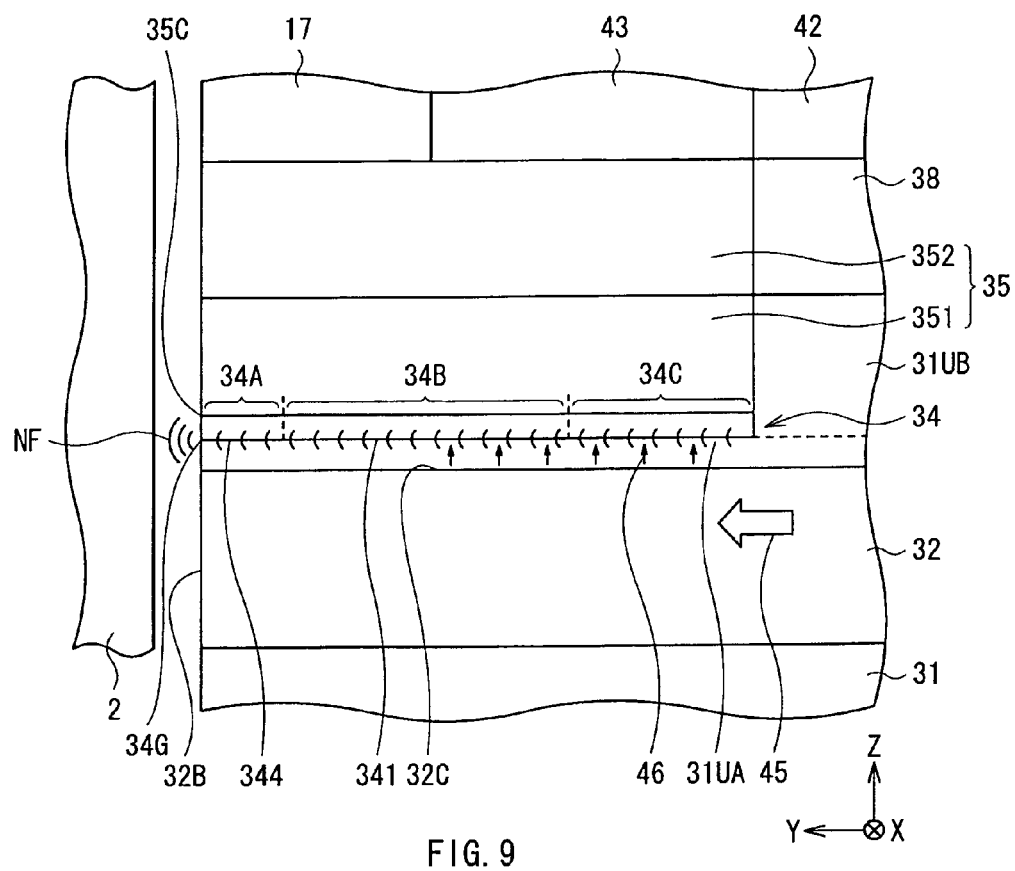
FIG. 9 is a cross-sectional view depicting a structure of a cross-sectional surface orthogonal to the air bearing surface on main parts of the magnetic reading/recording head.
Figure 10:
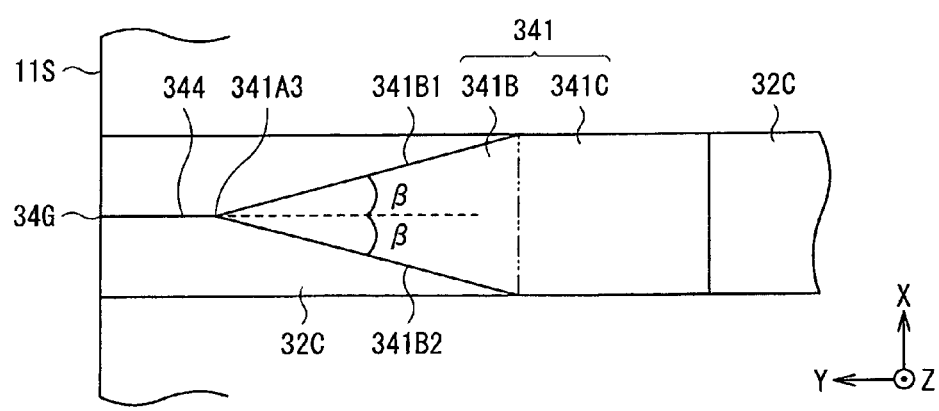
FIG. 10 is a top view depicting main parts on the magnetic reading/recording head.

Referring next to FIG. 7 to FIG. 10 in addition to FIG. 5, detailed description is given below on the structures, functions, and the like for the waveguide 32, the plasmon generator 34, and the magnetic pole 35. FIG. 7 is an exploded perspective view depicting the structures of the waveguide 32, the plasmon generator 34, and the magnetic pole 35, while FIG. 8 is a perspective view depicting shapes and positional relationship of the waveguide 32 and the plasmon generator 34. FIG. 9 depicts the structures and functions of the waveguide 32, the plasmon generator 34, and the magnetic pole 35 as a cross-sectional view orthogonal to the ABS 11S. FIG. 10 is a top view depicting main parts of the plasmon generator 34 when viewed from above.

As shown in FIG. 8 for example, in addition to the rear end face 32A shown in FIG. 4, the waveguide 32 has an end face 32B closer to the ABS 11S, an evanescent light generating surface 32C that is a top surface, a bottom surface 32D, and two side surfaces 32E and 32F. The evanescent light generating surface 32C generates evanescent light on the basis of the laser light propagated through the waveguide 32. Although FIG. 7 to FIG. 10 show examples where the end face 32B is arranged on the ABS 11S, the end face 32B may be arranged at a position separated away from the ABS 11S.

As shown in FIG. 8, the plasmon generator 34 has a first part 34A, a second part 34B, and a third part 34C in order from the side of the ABS 11S. In FIG. 8, a boundary between the second part 34B and the third part 34C is indicated with a chain double-dashed line. The constituent materials for the plasmon generator 34 include conductive materials containing one or more kinds among, for example, Pd (palladium), Pt (platinum), Rh (rhodium), Ir (iridium), Ru (ruthenium), Au (gold), Ag (silver), Cu (copper), and aluminum (Al). Here, the constituent materials for a lower layer 34L and an upper layer 34U may be of the same kinds or of different kinds.

As shown in FIG. 5, the first part 34A has a V-shaped central part C34 including an edge 344 protruding toward the waveguide on a cross-sectional surface parallel to the ABS 11S, and a pair of wing parts W34 that are in opposition to one another with the central part C34 interposed between in the track width direction (X-axis direction). Here, the shape of the cross-sectional surface parallel to the ABS 11S in the first part 34A is constant regardless of a distance from the ABS 11S.

At the central part C34 on the first part 34A, there is provided a V-shaped groove. Namely, a pair of sidewalls 34A1 and 34A2 each extending toward the direction orthogonal to the ABS 11S are connected to one another on the edge 344 to form a V shape having an apex angle α on the cross-sectional surface parallel to the ABS 11S. To enhance a generation efficiency of near-field light, the apex angle α may be in the order of, for example, 55 to 75 degrees. The edge 344 is a boundary part of a pair of sidewalls 34A1 and 34A2, extending toward the Y-axis direction from a base point of a pointed end 34G exposed to the ABS 11S up to the second part 34B. The pointed end 34G is a part for generating the near-field light. The edge 344 is opposed to the evanescent light generating surface 32C on the waveguide 32, and the sidewalls 34A1 and 34A2 are inclined so that a mutual spacing in the X-axis direction may become wider using the edge 344 as a base point according as they become more distant from the waveguide 32.

Also, on the wing parts W34 of the first part 34A, one end in the X-axis direction on each of a pair of fringes 34A3 and 34A4 is connected with an end on the side opposite to the edge 344 on the sidewalls 34A1 and 34A2. A pair of fringes 34A3 and 34A4 extend along, for example, a plane (XY plane) that is orthogonal to the ABS 11S and is parallel to the X-axis direction. The sidewalls 34A1 and 34A2 as well as the fringes 34A3 and 34A4 have front side end faces 342 exposed to the ABS 11S (FIG. 7 and FIG. 8). The first part 34A has almost constant thickness all over the central part C34 and a pair of wing parts W34.

As shown in FIG. 8, the second part 34B has a plate-like bottom 34B1 in opposition to the evanescent light generating surface 32C, two plate-like sidewalls 34B2 and 34B3, and fringes 34B4 and 34B5. The bottom 34B1 is structured in such a manner that the width in the X-axis direction is zero at a boundary portion with the first part 34A, while becoming greater according as the bottom 34B1 becomes more distant from the ABS 11S. The sidewalls 34B2 and 34B3 are provided in a standing state on the opposite side of the waveguide 32 at both ends of the bottom 34B1 in the X-axis direction. Here, the sidewalls 34B2 and 34B3 are inclined so that a mutual spacing (distance in the X-axis direction) may become wider using a connection portion with the bottom 34B1 as a base point according as they become more distant from the waveguide 32. The sidewalls 3482 and 34B3 are coupled with the sidewalls 34A1 and 34A2 in the first part 34A, respectively. Further, the fringes 3484 and 34B5 are connected with ends on the opposite side of the bottom 34B1 on the sidewalls 34B2 and 34B3 respectively, while being coupled with the fringes 34A3 and 34A4 on the first part 34A respectively. Also, for the sidewalls 34B2 and 34B3 as well as the fringes 34B4 and 34B5, the cross-sectional surfaces orthogonal to their extending directions may take the shapes similar to those of, for example, the sidewalls 34A1 and 34A2 as well as the fringes 34A3 and 34A4 on the first part 34A.

A third part 34C has a bottom 34C1, sidewalls 34C2 and 34C3, a wall section 34C4 as well as fringes 34C5, 34C6, and 34C7. The bottom 34C1 is provided to extend in the XY plane in continuity with the bottom 34B1 on the second part 34B. The sidewalls 34C2 and 34C3 are coupled with the sidewalls 34B2 and 34B3 on the second part 34B respectively, while extending to be orthogonal to the ABS 11S. Here, the sidewalls 34C2 and 34C3 are inclined so that a mutual spacing (distance in the X-axis direction) may become wider using a connection portion with the bottom 34C1 as a base point according as they become more distant from the waveguide 32. The wall section 34C4 couples back side ends of the bottom 34C1 as well as the sidewalls 34C2 and 34C3. The fringes 34C5 and 34C6 are coupled with the fringes 34B4 and 34B5 on the second part 34B respectively, while extending to be orthogonal to the ABS 11S. The fringe 34C7 couples back side ends of the fringes 34C5 and 34C6 as well as the wall section 34C4. For the sidewalls 34C2 and 34C3 as well as the fringes 34C5 and 34C6, the cross-sectional surfaces orthogonal to their extending directions may take the shapes similar to those of, for example, the sidewalls 34A1 and 34A2 as well as the fringes 34A3 and 34A4 on the first part 34A. The wall section 34C4 and the fringe 34C7 may not be provided.

As shown in FIG. 7 and FIG. 8, the first part 34A, the second part 34B, and the third part 34C form a space for accommodating a first layer 351 of the magnetic pole 35 in their inner sides.

The surfaces in opposition to the evanescent light generating surface 32C at given intervals on the waveguide 32 at the bottoms 34B1 and 34C1 are first and second surfaces 341B and 341C structuring a surface plasmon excitation surface 341 as shown in FIG. 7. In FIG. 7, a boundary portion between the first surface 341B and the second surface 341C is indicated with a chain double-dashed line.

As shown in FIG. 6 and FIG. 7, the magnetic pole 35 has an end face 35T exposed to the ABS 11S. The end face 35T includes an end face 351T exposed to the ABS 11S on a first layer 351, and an end face 352T exposed to the ABS 11S on a second layer 352.

The first layer 351 of the magnetic pole 35 is accommodated within a space formed by the first part 34A, the second part 34B, and the third part 34C of the plasmon generator 34. Specifically, the first layer 351 has a first part 351A occupying a space formed by the first part 34A, a second part 351B occupying a space formed by the second part 34B, and a third part 351C occupying a space formed by the third part 34C. The first part 351A takes a triangle pole shape that comes into close contact with sidewalls 34A1 and 34A2 on the first part 34A of the plasmon generator 34 with the constant cross-sectional area parallel to the ABS 11S. Desirably, the width of the first part 351A in the X-axis direction is smaller than that of the end face 32B of the waveguide 32. Further, the width of the first part 351A is desirably smaller than that of a central part C34 on the first part 34A. This is because the maximum intensity of writing magnetic field from the magnetic pole 35 is increased in each case. Further, the end face 351T on the first part 34A has a pointed end 35C located at an apex on the opposite side of the second layer 352.

The second part 351B comes into close contact with sidewalls 34B2 and 34B3 as well as a bottom 34B1 on the second part 34B of the plasmon generator 34. A width of the second part 351B in the X-axis direction becomes greater according as it becomes more distant from the ABS 11S, while becoming greater according as it becomes more distant from the waveguide 32 in the Z-axis direction. The third part 351C comes into close contact with sidewalls 34C2 and 34C3 as well as a bottom 34C1 on the third part 34C of the plasmon generator 34. A width of the third part 351C in the X-axis direction is constant in the Y-axis direction, while becoming greater according as it becomes more distant from the waveguide 32 in the Z-axis direction.

As shown in FIG. 9, a part of the clad 31U that is disposed between the evanescent light generating surface 32C and the surface plasmon excitation surface 341 serves as a buffer section 31UA. A part of the clad 31U that is located at the back side of the plasmon generator 34 and the first layer 351 is a back side section 31UB.

FIG. 10 is a top view depicting a positional relationship between the surface plasmon excitation surface 341 and the evanescent light generating surface 32C, illustrating a state where the plasmon generator 34 and the waveguide 32 are viewed from the side of the magnetic pole 35. For the plasmon generator 34, however, a surface in opposition to the evanescent light generating surface 32C is only shown, and others are omitted. As shown in FIG. 10, a width of the first surface 341B in the X-axis direction becomes smaller according as it comes closer to the ABS 11S. The first surface 341B has a front end 341A3 at a position where both ends 341B1 and 341B2 in the X-axis direction intersect with one another. The angle β that each of both ends 341B1 and 341B2 forms relative to the direction perpendicular to the ABS 11S (Y-axis direction) is equal. An angle β is within the range of, for example, 3 to 50 degrees, and is preferably within the range of 10 to 25 degrees in particular.

[3. Method of Manufacturing Magnetic Head Device]

Referring next to FIG. 11 to FIG. 15 in addition to FIG. 4, a method of manufacturing the magnetic head device 4A is described. FIG. 11 to FIG. 15 are perspective views depicting one step in the method of manufacturing the magnetic head device 4A, respectively.

(3-1. Method of Manufacturing Magnetic Reading/Recording Head Section)

Figure 11:
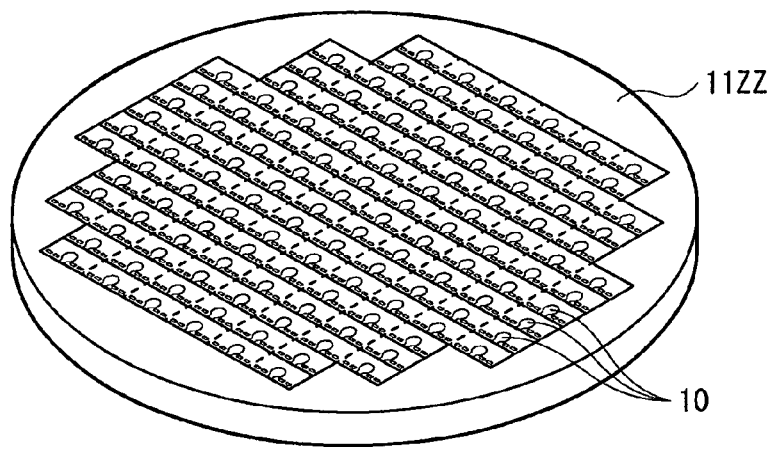
FIG. 11 is a perspective view depicting one step in a method of manufacturing the magnetic head device as shown in FIG. 1.

As shown in FIG. 11, a wafer 11ZZ configured of, for example, AlTiC is first prepared. The wafer 11ZZ eventually becomes a plurality of sliders 11. Subsequently, a plurality of magnetic reading/recording head sections 10 are formed in an array on the wafer 11ZZ using the following procedures.

The magnetic reading/recording head sections 10 are mainly manufactured by forming and layering a series of components sequentially using existing thin-film processes. The existing thin-film processes include a film formation technology including electrolytic plating technique or sputtering technique, a patterning technology including photolithographic technique, an etching technology including dry etching technique or wet etching technique, and a polishing technology such as a chemical mechanical polishing (CMP: chemical mechanical polishing) technique.

Here, an insulating layer 13 is first formed on the slider 11. Subsequently, a bottom shield layer 21, an MR element 22, an insulating layer 24, and a top shield layer 23 are formed to be layered in this order on the insulating layer 13 to form a reading head section 14. Thereafter, an insulating layer 25, an intermediate shield layer 26, and an insulating layer 27 are layered in order on the reading head section 14.

Subsequently, on the insulating layer 27, the bottom yoke layer 28, leading shield 29 and coupling layer 30, clad 31L, waveguide 32, clads 33A and 33B, clad 31U, plasmon generator 34, magnetic pole 35, as well as coupling layers 36 and 37 are formed in order. Note that a structure omitting the leading shield 29 may be also permitted. Further, top surfaces of the magnetic pole 35, an insulating layer 38, and the coupling layer 37 are planarized by performing the planarizing processing after forming the insulating layer 38 to cover the whole area, and thereafter the coil 41 that is embedded by insulating layers 39 and 42 is formed. Additionally, a recording head section 16 is completed by forming a top yoke layer 43 in connection with the magnetic pole 35 and the coupling layer 37. Afterward, a clad layer 17 is formed on the recording head section 16, and finally the side surface of a layer stack structure over an area from the slider 11 to the clad layer 17 is collectively polished by the use of the CMP technique and the like to form the ABS 11S. Such a process forms a plurality of magnetic reading/recording head sections 10 in an array on the wafer 11ZZ (FIG. 11).

Figure 12:
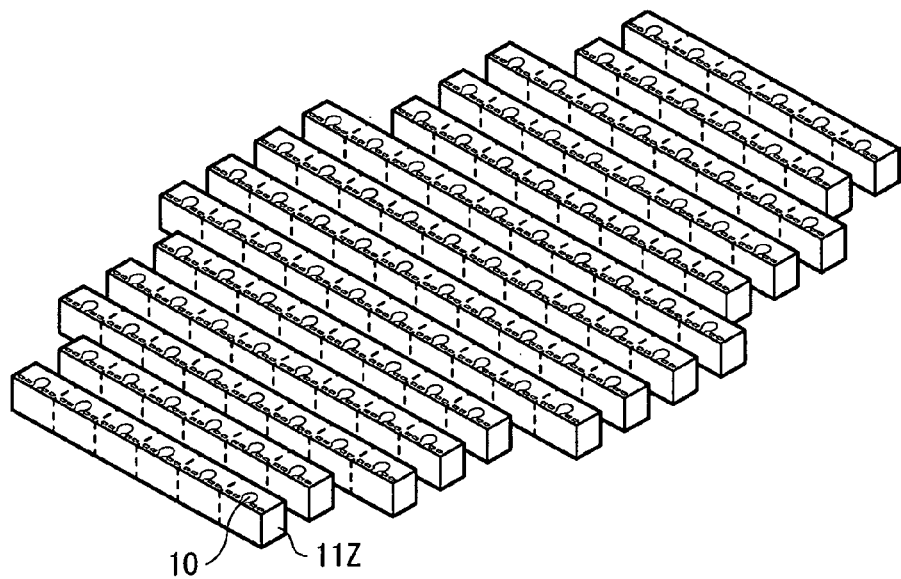
FIG. 12 is a perspective view depicting one step following FIG. 11.

Thereafter, the wafer 11ZZ is cut to form a plurality of bars 11Z as shown in FIG. 12. On the bars 11Z, a plurality of magnetic reading/recording head sections 10 are formed in a line. Further, mechanical polishing is performed on one end face of the bar 11Z followed by selective etching using the photolithographic technique or the like to form the ABS 11S.

(3-2. Method of Bonding Slider and Light Source Unit)

Figure 13:
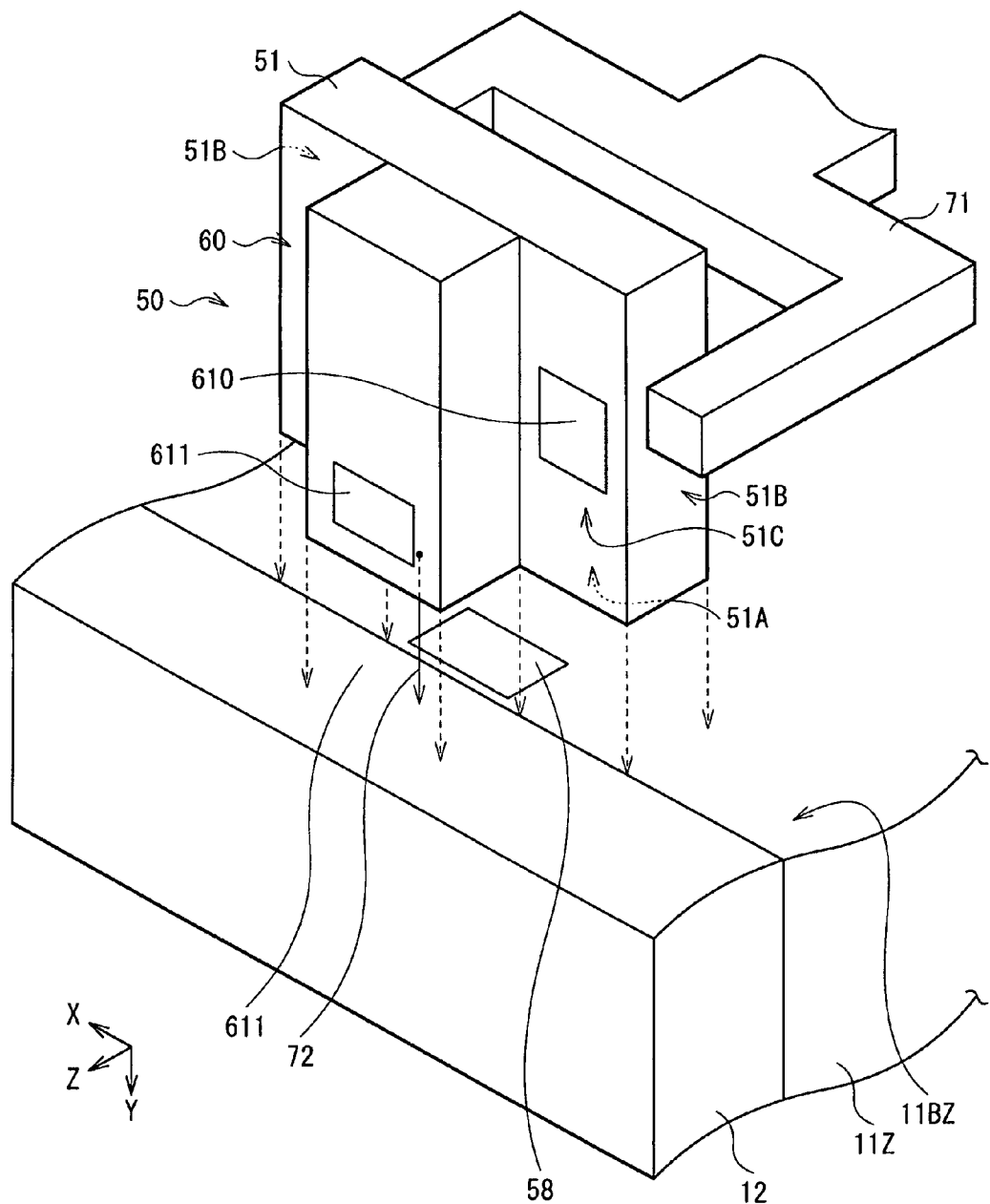
FIG. 13 is a perspective view depicting one step following FIG. 12.
Figure 14:
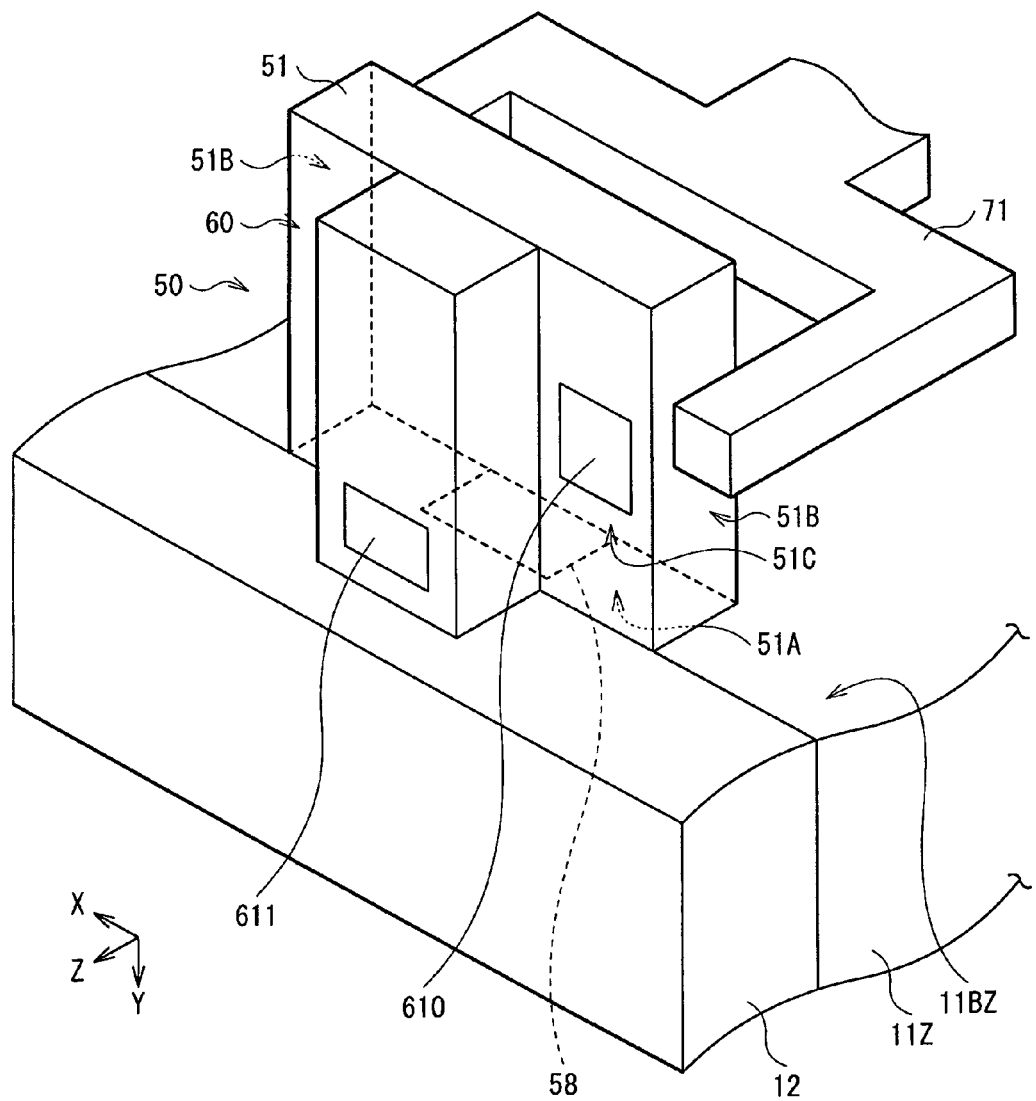
FIG. 14 is a perspective view depicting one step following FIG. 13.

Subsequently, the light source units 50 are prepared to bond them at each predetermined position on the bars 11Z following the procedures given below (refer to FIG. 13).

Specifically, in the first place, an bonding layer 58 is formed using, for example, a vapor deposition technique at a predetermined position on a rear surface 11BZ of the bar 11Z that is eventually used as a rear surface 11B of the slider 11. The bonding layer 58 is used for bonding the light source units 50 to the sliders 11. The bonding layer 58 is formed of, for example, solder, i.e., Sn (tin) element, or alloy containing Sn, Pb (lead), or Bi (bismuth). More specifically, it can be an alloy containing SnAu, SnCu, SnAl, SnSi, SnGe, SnMg, SnPb, SnAg, SnZn, SnBi, SnNi, SnPt, PbAu, PbMg, PbBi, BiAu, and others. Incidentally, the bonding layer 58 may be provided on a junction surface 51A of a supporting member 51 in opposition to the rear surface 11 BZ.

Next, the bar 11Z is placed on a stage (not shown in the figure) of an alignment apparatus, and thereafter the light source unit 50 is attached to a probe 71 of the alignment apparatus. At this time, the junction surface 51A of the supporting member 51 is placed in opposition to the rear surface 11BZ of the bar 11Z. Then, a given voltage is applied across terminal electrodes 610 and 611 of the laser diode 60 to emit a laser beam 72 from a luminescent center 62A (FIG. 4) of the active layer 62. On this occasion, the light source unit 50, the bar 11Z, and the element forming layer 12 are separated from each other at predetermined intervals, being movable relatively in the X-axis direction (track width direction) and Z-axis direction. Under such a condition, while keeping emitting the laser beam 72 and moving the light source unit 50 toward the X-axis direction (track width direction) and Z-axis direction, the near-field light NF from the end face exposed to the ABS 11S on the plasmon generator 34 is detected sequentially by means of an optical receiver element (not shown in the figure). Specifically, the laser beam 72 from the luminescent center 62A is incident onto the rear end face 32A of the waveguide 32, and subsequently is propagated through the waveguide 32 to reach the vicinity of the plasmon generator 34. A surface plasmon is generated in the plasmon generator 34, which is propagated toward the ABS 11S to eventually concentrate on a pointed end 34G (refer to FIG. 5), resulting in the near-field light NF being generated from the pointed end 34G. Movement of the light source unit 50 toward the X-axis direction and Z-axis direction is stopped at a position where the intensity of the near-field light NF to be detected by the optical receiver element has a maximum value. Afterward, the light source unit 50 is moved toward the Y-axis direction while keeping the relative position of the X-axis direction and Z-axis direction to come into contact with the bar 11Z via the bonding layer 58 as shown FIG. 14. This completes alignment of the light source unit 50 and the bar 11Z as well as that and the element forming layer 12.

Figure 15:
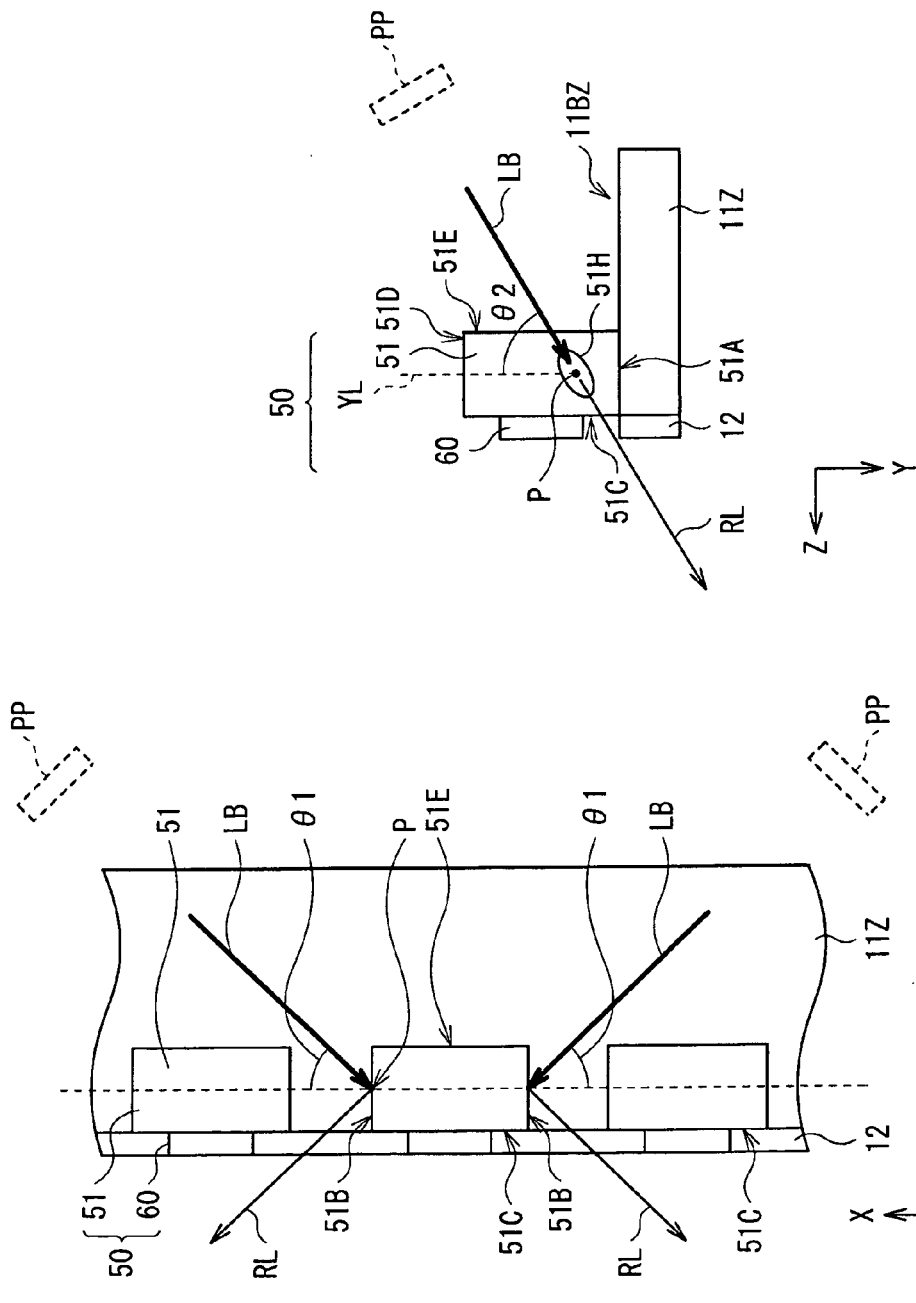
FIG. 15 is a perspective view depicting one step following FIG. 14.

Subsequently, as shown in FIG. 15 (A) and FIG. 15 (B), a laser beam LB with a predetermined wavelength transmitting through the supporting member 51 is irradiated to both side surfaces 51B on the supporting member 51. As an example of the laser beam LB, the Nd-YAG laser light (λ=1064 nm) can be used. This heats the supporting member 51. At an irradiation position P and its adjacent location on the both side surfaces 51B of the supporting member 51, an irradiation mark 51H is formed by the irradiation of the laser beam LB. The irradiation mark 51H has an elliptical planar shape in which the traveling direction of the laser beam LB as a major axis, being a pothole-shaped portion with gradually increasing depth along the traveling direction of the laser beam LB. Incidentally, FIG. 15 (A) is a top view with a plurality of light source units 50 placed in line on the bars 11Z viewed from above. FIG. 15 (B) is a side view with an arbitrary light source unit 50 viewed from the lateral side.

Here, as shown in FIG. 15 (A), the laser beam LB is irradiated to the supporting member 51 obliquely from behind. In other words, the laser beam LB is irradiated in a direction having a vector component along the Z-axis direction proceeding from the rear surface (surface on the opposite side of a light source mounting surface 51C) 51E of the supporting member 51 toward the light source mounting surface 51C. When a trajectory of the laser beam LB is projected on a plane (XZ plane) parallel to the rear surface 11B and junction surface 51A, an incident direction of the laser beam LB forms the angle θ1 relative to a lineup direction (X-axis direction) of the light source units 50. Even if a protective means such as a light shielding plate is not provided, therefore, damage of the bars 11Z due to reflective light RL of the laser beam LB from (the irradiation position P) on the side surface 51B can be avoided. Further, since the laser beam LB is radiated from the dead angle direction where the light source mounting surface 51C is hidden from view, it is unlikely that the laser diode 60 as well as its terminal electrodes 610 and 611 which is mounted on the light source mounting surface 51C could be damaged by erroneous irradiation (caused by displacement or the like) of the laser beam LB.

Figure 16:
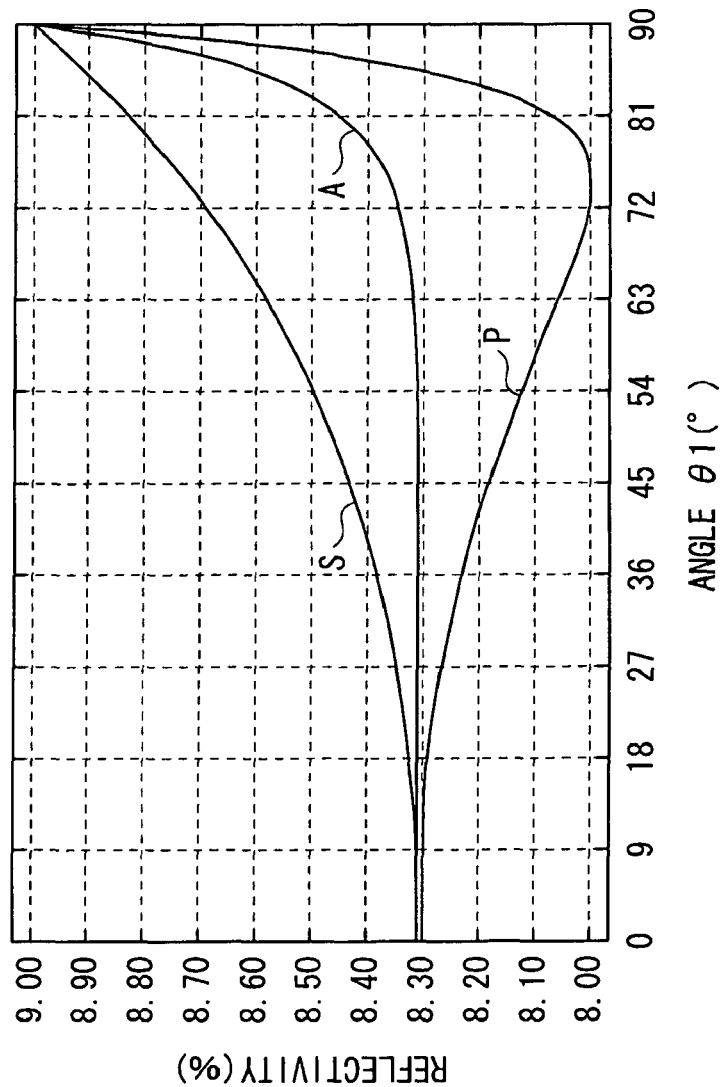
FIG. 16 is a characteristic diagram depicting a relationship between an incident angle and reflectivity of a laser beam.

Desirably, the angle θ1 is 75 degrees or less. This is because the energy is efficiently given to the supporting member 51 with the reflective light RL suppressed. FIG. 16 is a characteristic diagram depicting a relationship of the angle θ1 (degree) versus reflectivity (%) when the laser beam LB with wavelength of 1360 nm is incident into the side surface 51B as an example. In FIG. 16, a horizontal axis denotes the angle θ1 (degree), and a vertical axis denotes the reflectivity (%) on the side surface 51B. Further, curves S, P, and A in the diagram denote S polarized light, P polarized light, and average value, respectively. Also, for example, when a dimension of the supporting member 51 in the Z-axis direction is 100 μm, an interval between adjacent supporting members 51 (distance in the X-axis direction) is 500 μm, a diameter of the laser beam LB is 100 μm, the angle θ1 may be desirably within the range of 20 degrees to 60 degrees in order to achieve the irradiation to the side surface 51B while avoiding the irradiation to the rear surface 51D of the supporting member 51.

Additionally, as shown in FIG. 15 (B), the laser beam LB is irradiated obliquely from behind, that is, in the direction having a vector component along the Y-axis direction proceeding from the top surface (surface on the opposite side of the junction surface 51A) 51D of the supporting member 51 toward the junction surface 51A. Therefore, compared with the case where a vector component along the Y-axis direction in the laser beam LB is zero, the heat energy that is propagated from the irradiation position P to the bonding layer 58 increases. Here, the laser beam LB may be desirably incident at an angle θ2 that allows to avoid the reflective light RL from the irradiation position P from being incident onto the bar 11Z and the element forming layer 12. This is because damage of the bar 11Z and the element forming layer 12 due to the reflective light RL is avoided. Incidentally, the angle θ2 is an angle that the incident direction of the laser beam LB forms relative to the Y-axis direction orthogonal to the junction surface 51A and the rear surface 11B.

Through heat conduction from the supporting member 51 that is heated by the irradiation of the laser beam LB, the bonding layer 58 on which the energy is exerted melts. Subsequently, the melted bonding layer 58 becomes solidified quickly by stopping the irradiation of the laser beam LB. As a result, the supporting member 51 for the light source unit 50 and the slider 11 are bonded with accurate positional relationship maintained. Incidentally, the irradiation of the laser beam LB is carried out in a very short time in the order of, for example, 1 to 50 ms. Therefore, a thermal effect on the magnetic reading/recording head section 10 that is embedded in the element forming layer 12 can be avoided. Note that when a diameter of the laser beam LB is 100 μm, the irradiation position P may be desirably 150 μm or less from the rear surface 11BZ of the bar 11Z. Further, the laser beam LB may be desirably irradiated to the side surface 51B of the supporting member 51 in whole, instead of being irradiated to the rear surface 11BZ of the bar 11Z. This is because damage of the bar 11Z is avoided. Incidentally, the angle θ2 may be 0 degree. In such a case, since the irradiation position P can be lowered (can be put close to the rear surface 11BZ), heating of the bonding layer 58 can be performed efficiently. Also, the S-polarized light may be only irradiated as the laser beam LB. In such a case, the P-polarized light is shut off by placing a polarization plate between the light source (not shown in the figure) and the supporting member 51, and the S-polarized light is incident at a Brewster angle (e.g., 75 degrees) that is defined by the refraction index of a material (e.g., Si) corresponding to a wavelength of the laser beam LB. This can prevent the reflective light RL from arising on the irradiation surface (side surface 51B). Also, to suppress the reflective light on the side surface 51B, the side surface 51B may be a rough surface (for example, surface roughness $R_z$=0.2 to 0.8 μm).

The procedures mentioned above so far complete the manufacturing of the magnetic head device 4A.

[Control Circuit for Magnetic Disk Device]

Figure 17:
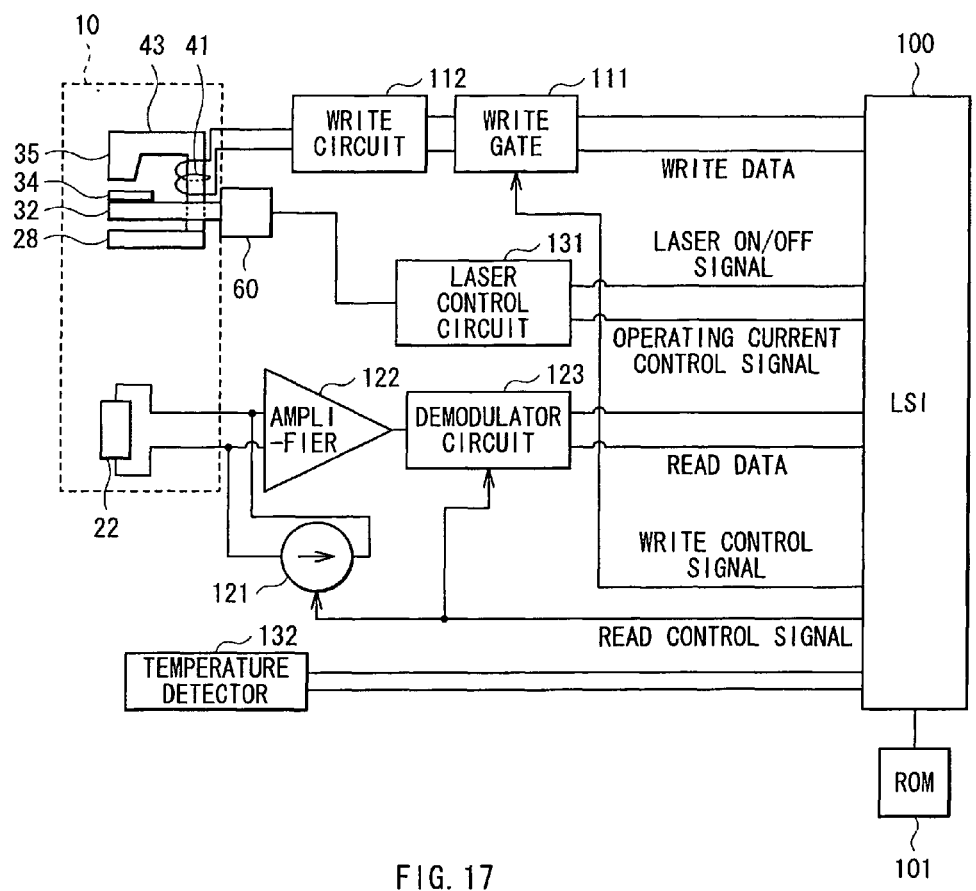
FIG. 17 is a block diagram showing a circuit configuration of the magnetic disk device as shown in FIG. 1.

Referring next to FIG. 17, description is given on a circuit configuration of the control circuit on the magnetic disk device shown in FIG. 1, and operation of the magnetic reading/recording head section 10. This control circuit is provided with a control LSI (Large-Scale Integrated Circuit) 100, a ROM (Read Only Memory) 101 that is connected with the control LSI 100, a write gate 111 that is connected with the control LSI 100, and a write circuit 112 for connecting the write gate 111 with coil 41. This control circuit is further provided with a constant current circuit 121 that is connected to the MR element 22 and the control LSI 100, an amplifier 122 that is connected to the MR element 22, and a demodulator circuit 123 that is connected to an output end of the amplifier and to the control LSI 100. Further, this control circuit is provided with a laser control circuit 131 that is connected with the laser diode 60 and the control LSI 100, and a temperature detector 132 that is connected with the control LSI 100.

Here, the control LSI 100 provides write data and write control signal to the write gate 111. Further, the control LSI 100 provides read control signal to the constant current circuit 121 and the demodulator circuit 123, and receives read data sent from the demodulator circuit 123 as an output. In addition, the control LSI 100 provides a laser ON/OFF signal and operating current control signal to the laser control circuit 131.

The temperature detector 132 detects a temperature at a magnetic write layer of the magnetic disk 2, and transmits information on this temperature to the control LSI 100.

The ROM 101 stores control tables and the like to control operating current values to be provided to the laser diode 60.

During the write operation, the control LSI 100 provides write data to the write gate 111. The write gate 111 provides the write data to the write circuit 112 only when the write control signal instructs a write operation. The write circuit 112 passes the write current to the coil 41 in accordance with this write data. This triggers the magnetic pole 35 to generate the writing magnetic field, through which data is written into the magnetic write layer of the magnetic disk 2.

During the read operation, the constant current circuit 121 provides constant sensing current to the MR element 22 only when the read control signal instructs a read operation. The output voltage of the MR element 22 is amplified by the amplifier 122 to be input to the demodulator circuit 123. When the read control signal instructs the read operation, the demodulator circuit 123 demodulates the output of the amplifier 122 to generate the write data, and provides the same to the control LSI 100.

The laser control circuit 131 controls the provision of an operating current to the laser diode 60 based on the laser ON/OFF signal, while controlling values of the operating current to be provided to the laser diode 60 based on the operating current control signal. When the laser ON/OFF signal instructs ON operation, operating current exceeding an oscillation threshold is provided to the laser diode 60 under control of the laser control circuit 131. As a result, the laser light is emitted from the laser diode 60, being propagated to the waveguide 32. Then, the near-field light NF (described later) is generated from the pointed end 34G of the plasmon generator 34, and a part of the magnetic write layer of the magnetic disk 2 is heated by the near-field light NF, causing a coercive force of that part to be decreased. During the write operation, data is written by applying the writing magnetic field generated by the magnetic pole 35 to a part of the magnetic write layer with a decreased coercive force.

With reference to a control table stored within the ROM 101, the control LSI 100 determines a value of operating current for the laser diode 60 in accordance with temperature and the like that are measured by the temperature detector 132 at the magnetic write layer of the magnetic disk 2, and controls the laser control circuit 131 using the operating current control signal so that that value of the operating current is provided to the laser diode 60. The control table includes, for example, data representing an oscillation threshold of the laser diode 60, and temperature dependency of optical output versus operating current characteristics. Further, the control table may include data representing a relationship between the operating current value and increased amount in temperature of the magnetic write layer heated by the near-field light NF, or data representing temperature dependency of a coercive force of the magnetic write layer.

In the control circuit as shown in FIG. 17, by having a signaling system for controlling the laser diode 60, that is, a signaling system for the laser ON/OFF signal and operating current control signal independently of a control signaling system for the read/write operation, not only a turn-on operation of the laser diode 60 simply in conjunction with a write operation, but also a more diversified range of turn-on modes of the laser diode 60 can be achieved. Note that the configuration of the control circuit for the magnetic disk device is not limited to the configuration as shown in FIG. 17.

Figure 18:
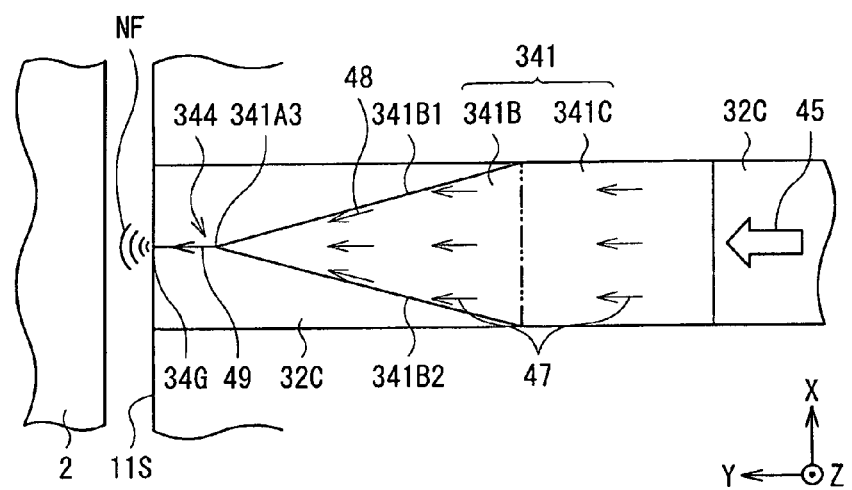
FIG. 18 is an explanatory diagram for illustrating operation of the magnetic reading/recording head.

Referring next to FIG. 9 and FIG. 18, description is given on the principle for generation of the near-field light and the principle for the thermally-assisted magnetic recording by the use of the near-field light in the present embodiment. As with FIG. 10, FIG. 18 is a top view depicting a positional relationship between the surface plasmon excitation surface 341 and the evanescent light generating surface 32C, representing a state where the plasmon generator 34 and the waveguide 32 are viewed from the side of the magnetic pole 35.

The laser beam emitted from the laser diode 60 is propagated through the waveguide 32 to reach the vicinity of the plasmon generator 34. At this time, total reflection of the laser light 45 on the evanescent light generating surface 32C that is an interface between the waveguide 32 and a buffer portion 33A generates the evanescent light 46 (FIG. 9) permeating into the buffer portion 33A. Thereafter, a surface plasmon polariton mode is induced by coupling of the evanescent light 46 and charge fluctuation in the surface plasmon excitation surface 341 on the outer surface of the plasmon generator 34, resulting in the surface plasmon 47 (FIG. 18) being excited on the surface plasmon excitation surface 341. The surface plasmon 47 is propagated toward the pointed end 34G on the surface plasmon excitation surface 341. As mentioned previously, the first surface 341B on the surface plasmon excitation surface 341 is structured so that the width in the X-axis direction becomes smaller according as it comes closer to the ABS 11S. Therefore, during propagation through the first surface 341B, the surface plasmon 47 is gradually converted into an edge plasmon 48 (FIG. 18) as a surface plasmon that is propagated along edges 341B1 and 341B2, and the magnetic field intensity of the plasmon including the surface plasmon 47 and the edge plasmon 48 is enhanced. On reaching an edge 344, the surface plasmon 47 and the edge plasmon 48 are converted into an edge plasmon 49 (FIG. 18), being propagated toward the ABS 11S along the edge 344. The edge plasmon 49 reaches the pointed end 34G eventually. As a result, the edge plasmons 49 concentrate on the pointed end 34G, and the near-field light NF is generated from the pointed end 34G depending on the concentrated edge plasmons 49. The near-field light NF, which is irradiated toward the magnetic disk 2, reaches the top surface (write surface) on the magnetic disk 2, heating a part of the magnetic write layer of the magnetic disk 2. This decreases a coercive force in the part of the heated magnetic write layer. In the thermally-assisted magnetic recording, data is written by applying a writing magnetic field generated by the magnetic pole 35 to the part of the magnetic write layer with a coercive force decreased in such a manner.

It is assumed to be due to the following first and second principles that the magnetic field intensity of the plasmon is enhanced on the first surface 341B. In the first place, the first principle is described. In the present embodiment, to begin with, on the surface plasmon excitation surface 341, the surface plasmon 47 is excited on a metal surface by the evanescent light 46 arising from the evanescent light generating surface 32C. The surface plasmon 47 is propagated toward the pointed end 34G on the surface plasmon excitation surface 341. A wave number of the surface plasmon 47 that is propagated through the first surface 341B becomes greater gradually according as the width of the first surface 341B in the X-axis direction becomes smaller, that is, as it comes closer to the ABS 11S. With increased wave number of the surface plasmon 47, the traveling speed of the surface plasmon 47 is decreased. As a result, it is assumed that the energy density of the surface plasmon 47 increases, thereby enhancing the magnetic field intensity of the surface plasmon 47.

Next, the second principle is described. When the surface plasmon 47 is propagated toward the pointed end 34G on the surface plasmon excitation surface 341, a part of the surface plasmon 47 hits against the edges 341B1 and 34B2 of the first surface 341B to scatter, causing a plurality of plasmons with different wave numbers to be generated. A part of a plurality of plasmons that are thus generated is converted into the edge plasmon 48 with wave number greater than that of a surface plasmon being propagated on the plane. In this way, the surface plasmon 47 is gradually converted into the edge plasmon 48 that is propagated along the edges 341B1 and 341B2, and the magnetic field intensity thereof is gradually increased. The edge plasmon 48 has a greater wave number and higher traveling speed compared with a surface plasmon being propagated on the plane. Therefore, the energy density of the plasmon is increased by conversion of the surface plasmon 47 into the edge plasmon 48. Further, on the first surface 341B, along with conversion of the surface plasmon 47 into the edge plasmon 48 as mentioned above, a new surface plasmon 47 based on the evanescent light 46 arising from the evanescent light generating surface 32C is also generated. This new surface plasmon 47 is also converted into the edge plasmon 48. As a result, the magnetic field intensity of the edge plasmon 48 is increased. The edge plasmon 48 is converted into the edge plasmon 49 that is propagated through the edge 344. In such a manner, the edge plasmon 49 is obtained that has enhanced magnetic field intensity compared with the surface plasmon 47 during initial phase of generation.

In the present embodiment, the surface plasmon 47 being propagated on the plane and the edge plasmon 48 with wave number greater than that of the surface plasmon 47 coexist on the first surface 341B. On the first surface 341B, it is assumed that the magnetic field intensity for both of the surface plasmon 47 and the edge plasmon 48 is increased based on the first and second principles mentioned above. In the present embodiment, therefore, the magnetic field intensity of the plasmon can be further enhanced compared with the case where one of the first principle and the second principle is only based.

In the present embodiment, the light source unit 50 and the slider 11 (bar 11Z) are bonded to one other by radiating the laser beam LB to the side surface 51B of the supporting member 51 as mentioned above. The laser beam LB is radiated to the supporting member 51 from the back side where the light source mounting surface 51C provided with the laser diode 60 is at a dead angle. If the laser beam LB is irradiated from the front side of the light source unit 50, there are possibilities that the laser diode 60 as well as the terminal electrodes 610 and 611 thereof that are provided on the light source mounting surface 51C may be damaged due to erroneous irradiation of the laser beam LB. In the present embodiment, however, such a damage caused by the erroneous irradiation can be avoided. In accordance with the present embodiment, therefore, the thermally-assisted magnetic head device that has exceptionally high positional accuracy between the light source unit 50 and the magnetic reading/recording head section 10 and suitable for high-density writing can be achieved.

While the invention has been described citing the embodiments hitherto, the invention is not limited to the above-cited embodiments, but can take various forms. In the present embodiment, for example, description has been provided taking the CPP-type GMR element as a read element as an example, but it is not limited thereto. It may be a CIP (Current In Plane)-GMR element. In this case, it is necessary to provide an insulating layer each between the MR element and the bottom shield layer and between the MR element and the top shield layer, as well as to insert a pair of leads for supplying the sensing current to the MR element into the insulating layers. Alternatively, a TMR (tunneling magnetoresistance) element having a tunnel junction film can be also used as the write element.

For the thermally-assisted magnetic recording head according to the invention, structure (such as shape and positional relationship) each of the waveguide, plasmon generator, magnetic pole, and the like is not limited to those according to the embodiments as mentioned above, but the thermally-assisted magnetic recording head having any other structures may be also usable.

The corresponding relationship between the reference numerals and the Elements in the present embodiment is summarized as follows. 1 . . . housing, 2 . . . magnetic disk, 3 . . . head arm assembly (HAA), 4 . . . head gimbals assembly (HGA), 4A . . . magnetic head device, 4B . . . suspension, 5 . . . arm, 6 . . . drive section, 7 . . . fixed shaft, 8 . . . bearing, 9 . . . spindle motor, 10, 10A . . . magnetic reading/recording head section, 11 . . . slider, 11A . . . element forming surface, 11B . . . rear surface, 11S . . . air bearing surface (ABS), 12 . . . element forming layer, 13 . . . insulating layer, 14 . . . reading head section, 16 . . . recording head section, 17 . . . clad, 21 . . . bottom shield layer, 22 . . . MR element, 23 . . . top shield layer, 24, 25, 27, 38, 39, 42 . . . insulating layer, 28 . . . bottom yoke layer, 29 . . . leading shield, 30, 36, 37 . . . coupling layer, 31L, 31U, 33A, 33B . . . clad, 32, 72 . . . waveguide, 34 . . . plasmon generator, C34 . . . central part, W34 . . . wing part, 34A to 34C . . . first to third parts, 34G . . . pointed end, 34L . . . lower layer, 34U . . . upper layer, 341 . . . surface plasmon excitation surface, 344 . . . edge, 35, 75 . . . magnetic pole, 351 . . . first layer, 352 . . . second layer, 40A, 40B . . . coupling portion, 41 . . . coil, 43 . . . top yoke layer, 45 . . . laser light, 46 . . . evanescent light, 47 . . . surface plasmon, 48, 49 . . . edge plasmon, 50 . . . light source unit, 51 . . . supporting member, 51A . . . junction surface, 51B . . . side surface, 51C . . . light source mounting surface, 58 . . . bonding layer, 60 . . . laser diode, 61 . . . bottom electrode, 62 . . . active layer, 63 . . . top electrode, 64 . . . reflective layer, 65 . . . n-type semiconductor layer, 66 . . . p-type semiconductor layer, 71 . . . probe, NF . . . near-field light.

What is claimed is:

1. A thermally-assisted magnetic recording head, comprising:
   a slider having a thermally-assisted magnetic recording head section thereon; and
   a light source unit including a substrate and a light source mounted on the substrate, the substrate having a first surface which supports the light source, a second surface bonded to the slider with a bonding layer in between, and a third surface which intersects both of the first and second surfaces and has a laser beam irradiation mark thereon,
   wherein the laser beam irradiation mark has a pothole-shaped profile having a deepest point at a position which is, on a plan view, closer to the first surface than a center position of the laser beam irradiation mark.

2. The thermally-assisted magnetic recording head according to claim 1, wherein the deepest point of the laser beam irradiation mark is located at a position closer to the second surface than the center position on a plan view.

3. The thermally-assisted magnetic recording head according to claim 2, wherein the laser beam irradiation mark has a planar shape of an oval.

4. The thermally-assisted magnetic recording head according to claim 3, wherein an angle between a long axis direction of the oval and the second surface is at least 0 degree but no more than 90 degrees.

5. The thermally-assisted magnetic recording head according to claim 1, wherein the substrate has a fourth surface on an opposite side of the third surface, the fourth surface having a laser beam irradiation mark thereon as well.

6. The thermally-assisted magnetic recording head according to claim 1, wherein the laser beam irradiation marks on the third and fourth surfaces have a relationship of plane symmetry with one another.

7. The thermally-assisted magnetic recording head according to claim 1, wherein the thermally-assisted magnetic recording head section has a magnetic pole having an end face exposed to an air bearing surface, and a waveguide extending toward the air bearing surface to propagate light.

8. The thermally-assisted magnetic recording head according to claim 7, wherein the light source unit is bonded to the slider to allow the light source to be opposed to the waveguide.

9. The thermally-assisted magnetic recording head according to claim 7, wherein the thermally-assisted magnetic recording head section further has a plasmon generator between the magnetic pole and the waveguide, the plasmon generator generating the near-field light from the air bearing surface based on the light propagated through the waveguide.

10. The thermally-assisted magnetic recording head according to claim 1, wherein the light source unit is a laser diode.

11. The thermally-assisted magnetic recording head according to claim 1, wherein the bonding layer is formed of Sn (tin), or formed of alloy containing Sn, Pb (lead), or Bi (bismuth).

12. A head gimbals assembly, comprising:
a suspension; and
the thermally-assisted magnetic recording head according to claim 1 that is attached to one end of the suspension.

13. A head arm assembly, comprising:
a suspension;
the thermally-assisted magnetic recording head according to claim 1 that is attached to one end of the suspension; and
an arm supporting the other end of the suspension.

14. A magnetic disk device, comprising:
a magnetic write medium; and
a head arm assembly,
wherein the head arm assembly includes:
a suspension,
the thermally-assisted magnetic recording head according to claim 1 that is attached to one end of the suspension, and
an arm supporting the other end of the suspension.

15. A method of manufacturing a thermally-assisted magnetic recording head comprising:
providing a bar and a plurality of light source units, the bar having a plurality of thermal-assisted magnetic recording head sections arranged in a first direction that is a longitudinal direction, each of the light source units including a substrate and a light source mounted on the substrate, the substrate having a first surface which supports the light source, a second surface, and a third surface intersecting both of the first and second surfaces;
aligning the plurality of light source units to the thermally-assisted magnetic recording head sections on the bar, respectively, while allowing the first surface of the substrate to be parallel to the first direction, and then performing a bonding between the second surface of the substrate and the bar with a bonding layer in between; and
separating the bar into a plurality of sliders each including one of the thermally-assisted magnetic recording head sections and one of the light source units,
wherein the bonding allows the third surface of the substrate to be irradiated by a laser beam from a dead angle direction where the first surface is hidden from view, to thereby allow the bonding layer to be melted.

16. The method of manufacturing the thermally-assisted magnetic recording head according to claim 15, wherein the laser beam is radiated to the third surface obliquely from an upper side.

17. The method of manufacturing the thermally-assisted magnetic recording head according to claim 15, wherein the third surface is irradiated with the laser beam from a direction which allows laser beam light reflected from the third surface to be inhibited from entering into the bar.

18. The method of manufacturing the thermally-assisted magnetic recording head according to claim 15, wherein S-polarized light as the laser beam is allowed to enter the third surface at a Brewster angle which is defined depending on a refraction index of the substrate and a wavelength of the laser beam.

19. The method of manufacturing the thermally-assisted magnetic recording head according to claim 15, wherein the bonding layer is formed of Sn (tin), or formed of alloy containing Sn, Pb (lead), or Bi (bismuth).

* * * * *